(12) United States Patent
Claes

(10) Patent No.: US 11,353,674 B2
(45) Date of Patent: Jun. 7, 2022

(54) TOOL AND METHOD FOR INSERTING OPTICAL FIBERS INTO A TUBE

(71) Applicant: CommScope Connectivity Belgium BVBA, Kessel-Lo (BE)

(72) Inventor: Peter Claes, Berlaar (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 460 days.

(21) Appl. No.: 16/279,114

(22) Filed: Feb. 19, 2019

(65) Prior Publication Data

US 2019/0258016 A1 Aug. 22, 2019

Related U.S. Application Data

(60) Provisional application No. 62/633,896, filed on Feb. 22, 2018.

(51) Int. Cl.
*G02B 6/54* (2006.01)
*G02B 6/44* (2006.01)
*H02G 1/08* (2006.01)

(52) U.S. Cl.
CPC ............ *G02B 6/54* (2013.01); *G02B 6/4459* (2013.01); *G02B 6/4463* (2013.01); *H02G 1/08* (2013.01)

(58) Field of Classification Search
CPC ...... G02B 6/4463; G02B 6/4459; G02B 6/54; H02G 1/08; B25B 33/00; B25B 27/00; B25B 27/0092
USPC ......................... 254/134.3 r, 134.3 ft; 81/488
See application file for complete search history.

(56) References Cited

U.S. PATENT DOCUMENTS

| 3,160,394 A * | 12/1964 | Hunter | H05K 13/0007 254/134.3 R |
|---|---|---|---|
| 2004/0071431 A1* | 4/2004 | Trouchet | G02B 6/36 385/137 |
| 2005/0127237 A1* | 6/2005 | James | H02G 1/085 242/615.3 |

* cited by examiner

*Primary Examiner* — Lee D Wilson
*Assistant Examiner* — Alberto Saenz
(74) *Attorney, Agent, or Firm* — Merchant & Gould P.C.

(57) ABSTRACT

Tools and associated methods for facilitating feeding of optical fibers into a tube. In particular, the tools and associated methods are adapted to remove overlaps and tangles in the fibers as they are being fed into the tube. In this way, the number of fibers that can be fed into a tube of given transverse cross-sectional area can be maximized.

24 Claims, 17 Drawing Sheets

TOOL AND METHOD FOR INSERTING OPTICAL FIBERS INTO A TUBE

RELATED APPLICATIONS

This application claims the benefit of U.S. patent application Ser. No. 62/633,896, filed Feb. 22, 2018, the disclosure of which is incorporated herein by reference in its entirety.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

Optical fibers are routed to and between numerous kinds of telecommunications equipment, such as racks, cabinets, splice trays, patch panels, etc. Often, multiple fibers (in the form of, e.g., pigtails, patch cords, etc.) are routed from a first location to a second location. To efficiently organize the fibers being routed, they can be fed into a casing, such as a tube or tubular housing. Such tubes/casings can also provide protection to the optical fibers they house. A variety of other applications similarly require feeding of a plurality separate optical fibers into a tube.

Due to space and cost constraints, and the large number of optical fibers often managed at a given piece of equipment, it is desirable to route groups of fibers using the smallest diameter tubes or casings available. However, feeding optical fibers into a tube that is only just large enough to accommodate the fibers can be challenging.

SUMMARY

In general terms, the present disclosure is directed to a tool, and associated methods of using the tool, for feeding a plurality of optical fibers into a tube or other casing. The optical fibers can be loose or fixed/connected at one end. The optical fibers can be part of patch cords or pigtails. The optical fibers can be connectorized (e.g., with an SC type or LC type connector) or not connectorized.

Although the specific embodiments and applications herein will be described in the context of optical fibers and telecommunications equipment, it should be appreciated that the principles of this disclosure can be readily applied to the feeding of other non-optical fibers, wires (e.g., electrical wires), or other elements (e.g., cable strength members) into a tube or casing.

The tube/casing can have any desired axial length and can be made of a flexible or rigid material. In typical applications, however, the tube/casing will be flexible to facilitate routing of the fibers from one location to another location. The tube also can be adapted to protect the optical fibers it houses. For example the tube can provide protection by acting as a covering layer for the fibers. In addition, the tube can be configured to operably bend no more than the minimum bend radii of the optical fibers it houses.

Feeding of the optical fibers into the tube can be performed by hand or otherwise. That is, the tools of the present disclosure can be operated manually or with the aid of one or more other tools or machines.

The tools of the present disclosure can be adapted to maximize the number of optical fibers that can be fed into a tube having a bore of a given transverse cross-sectional area. More particularly, the tools of the present disclosure can be adapted to maximize the number of optical fibers that can be fed into a tube having a bore of a given transverse cross-sectional area by helping to minimize or eliminate overlapping or tangling of the fibers as they are being advanced into the tube.

According to certain aspects of the present disclosure, a tool for feeding optical fibers into a tube comprises: a base extending along an axial direction from a proximal end to a distal end; a first arm extending from the base and defining a slot adapted to support a transversely arranged plurality of optical fibers; and a second arm extending from the base distally of the first arm, the second arm defining a passage having open proximal and distal ends, the passage being adapted to hold and/or be in communication with a portion of a tube.

According to further aspects of the present disclosure a tool for feeding optical fibers into a tube comprises: a base extending along an axial direction from a proximal end to a distal end; a first arm extending from the base and defining a transversely elongated slot adapted to support a transversely arranged plurality of fibers; and a second arm extending from the base distally of the first arm, the second arm defining an axially elongated passage having open proximal and distal ends, the axially elongated passage being adapted to hold and/or be in communication with a portion of a tube.

In some examples of the foregoing tools, a width of the slot is less than twice a transverse thickness of each of the plurality of optical fibers.

In some examples of the foregoing tools, the tool defines a fiber handling region between the first and second arms, the fiber handling region adapted to facilitate grasping (e.g., by hand or with a grasping tool) of the plurality of optical fibers between the slot and the passage.

In some examples of foregoing tools, the slot has an open transverse end and a closed transverse end, wherein the plurality of optical fibers can be transversely inserted into the slot via the open transverse end in the slot. In some examples, the slot has opposing proximal and distal open axial sides.

In some examples of the foregoing tools, the second arm is adapted to clamp or secure the tube in the passage.

In some examples of the foregoing tools, the slot is a first slot and the second arm includes a second slot, e.g. an axially elongated slot, in communication with the passage at a first open transverse end, the second slot having a transversely opposing open second end and allowing the plurality of optical fibers to transversely pass through the second slot. In some examples, the second slot has opposing open axial ends. In some examples, the open second transverse end of the second slot and the open transverse end of the first slot face the same direction.

In some examples of the foregoing tools, the passage is radially sized to receive and/or hold the tube therein. In some examples, the passage does not receive the tube, and the tube is instead positioned to be in communication with the passage, e.g., the tube is positioned at the distal end of the tube and axially aligned with the passage. In some examples, the tool further comprises a clamp or clamping piece for clamping the tube to the second arm while feeding the plurality of optical fibers into the tube. In some examples, the clamp/clamping piece cooperates with the second slot to clamp the tube. In some examples, the clamp/clamping piece includes a wedge portion and the second slot is tapered to snugly receive the wedge portion.

In some examples, the clamp/clamping piece includes a curved surface adapted to abut the tube and/or apply a clamping force to the tube.

In some examples of the foregoing tool, the base includes a horizontal surface, the first and second arms extend vertically from the base, and the first slot is elongated in the horizontal direction. In some examples, the first slot is at least partially horizontally aligned with the passage. In some examples, a vertical center of the first slot and a vertical center of the passage are in the same horizontal plane.

In some examples of the foregoing tool, the base includes a horizontal surface, the first and second arms extend vertically, and the first slot is elongated in the vertical direction. In some examples, the first slot is at least partially horizontally aligned with the passage. In some examples, a horizontal center of the first slot and a vertical center of the passage are in the same horizontal plane.

According to further aspects of the present disclosure, a method of feeding a plurality of optical fibers into a tube comprises: providing a tool, the tool comprising a base extending along an axial direction from a proximal end to a distal end; a first arm extending from the base and defining a slot; and a second arm extending from the base distally of the first arm, the second arm defining a passage having open proximal and distal ends; inserting a portion of the tube into the axially elongated passage; loading portions of the plurality of fibers into the slot such that the plurality of optical fibers form a single row of fibers within the slot; pulling the plurality of optical fibers distally through the slot; and feeding the plurality of optical fibers into the tube via the open proximal end of the passage.

In some examples of the foregoing methods, the optical fibers each have a transverse diameter, and the plurality of optical fibers is the maximum number of optical fibers having the transverse diameter that can be axially fed into the tube.

In some examples of the foregoing methods, the method further comprises clamping the tube in the passage with a clamping piece.

In some examples of the foregoing methods, the slot is a first slot, and the method further comprises, prior to the feeding, transversely inserting the plurality of fibers into the passage via a second slot in the second arm.

In some examples of the foregoing methods, the slot is a first slot, and the method further comprises, after the feeding, transversely sliding proximal portions of the plurality of fibers out of the tool via a second slot in the second arm, the second slot being in communication with the passage.

In some examples of the foregoing methods, the method further comprises, prior to the transversely sliding, distally removing the tube from the passage.

According to further aspects of the present disclosure, a method of feeding a plurality of optical fibers into a tube comprises: providing a tool, the tool comprising a base extending along an axial direction from a proximal end to a distal end; a first arm extending from the base and defining a first slot; and a second arm extending from the base distally of the first arm, the second arm defining a passage having open proximal and distal ends, and a second slot that is open to the passage; loading first portions of the plurality of optical fibers in a single transverse row in the slot via an open end in the slot; loading second distal portions of the plurality of optical fibers in a proximal section of the passage via the second slot; positioning an end of the tube in a distal section of the passage, the end of the tube being positioned distally from the distal ends of the fibers; plugging the second slot with a clamping piece such that a surface of the clamping piece abuts the tube; grasping the plurality of optical fibers by hand or with a tool; distally advancing the plurality optical fibers into the tube; removing the clamping piece from the second slot; and disengaging the tube loaded with the plurality of optical from the tool.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
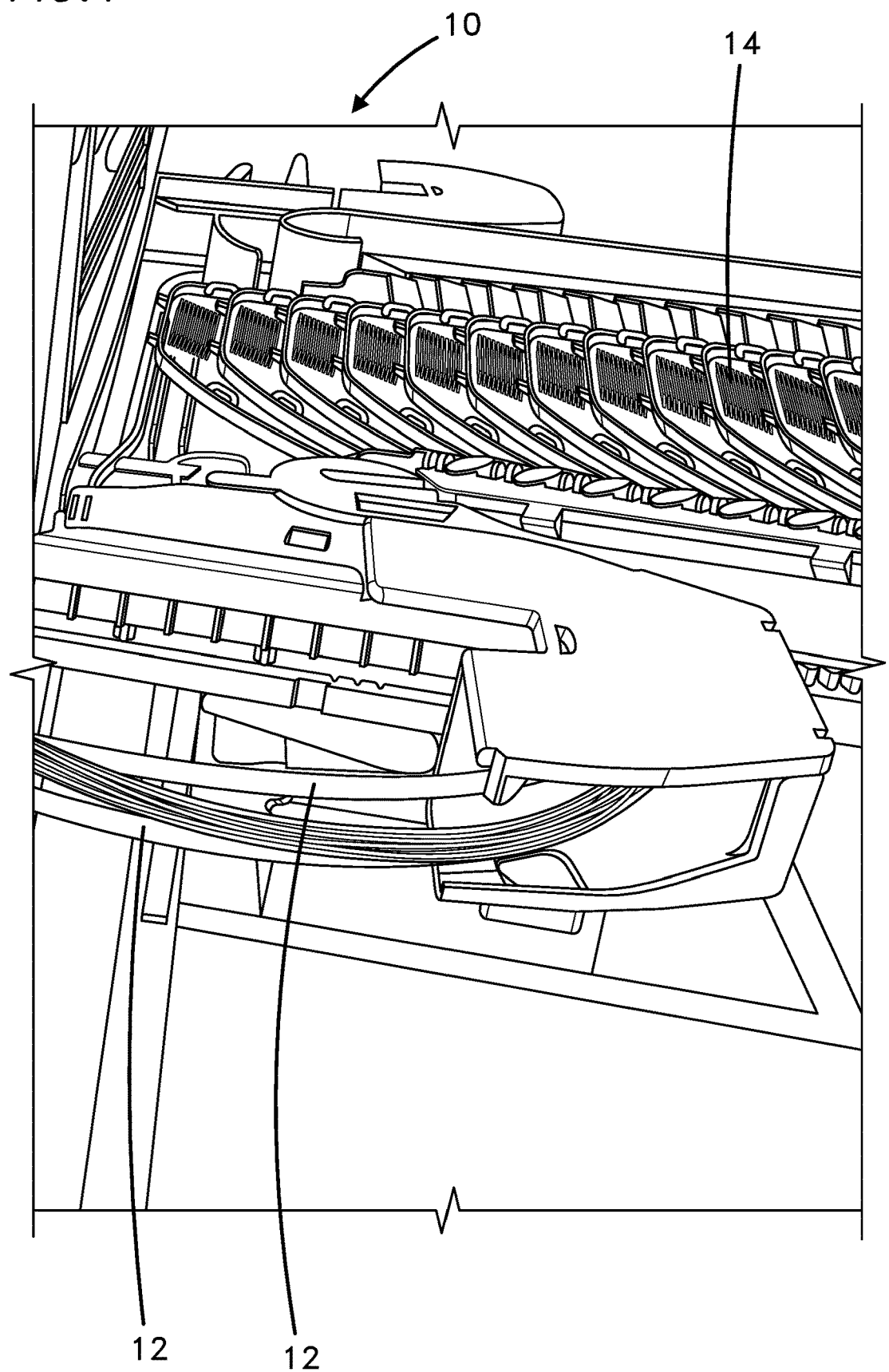
FIG. 1 shows telecommunications equipment including optical fiber routing and protective tubes.

Referring to FIG. 1, in example telecommunications equipment 10, flexible and protective tubes 12 house and route lengths of optical fibers from one location to another location while protecting the optical fibers. In this example, the tubes 12 route optical fibers from a splice tray 14 to another location, e.g., to a rack a drawer disposed within an interior volume of a telecommunications cabinet. The optical fibers in the tubes 12 can have a connectorized end and a non-connectorized end, the non-connectorized ends being fed into the tubes 12. Once routed to the desired location via the tubes 12, the optical fibers can be stored or connected to other fibers, e.g., by terminating the non-connectorized ends with connectors and interfacing the connectors with other connectors.

Figure 2:
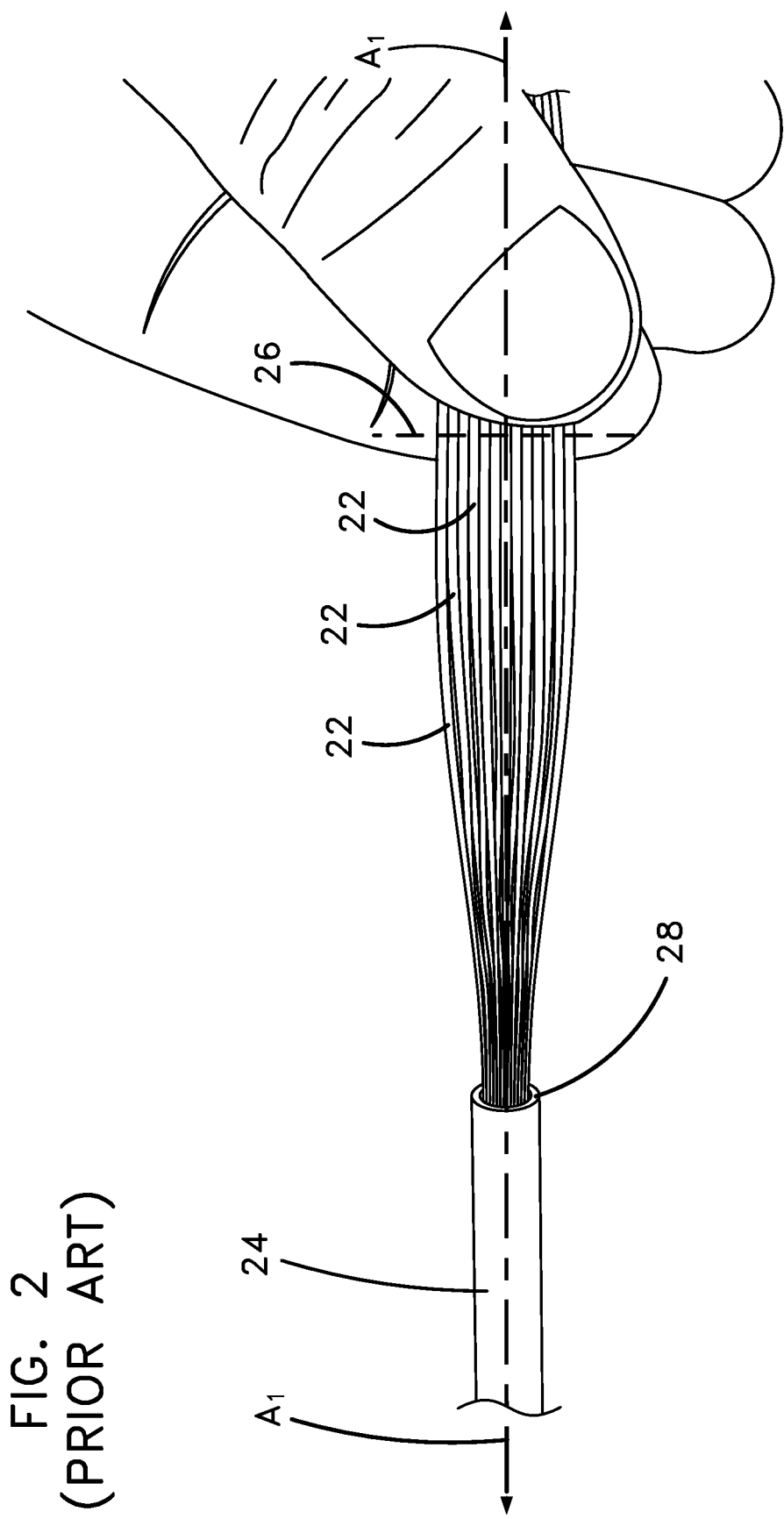
FIG. 2 represents an example method of feeding optical fibers into a fiber routing or protective tube according to the prior art.

Referring to FIG. 2, according to the prior art, a technician manually feeds optical fibers 22 (the optical fibers are coated) into a tube 24. Optionally, the tube 24 can correspond to one of the tubes 12 in FIG. 1.

In the example in FIG. 2, a total of twelve optical fibers 22 are being fed into the tube 24. Tangles or overlaps of the fibers 22 can prevent all twelve optical fibers from fitting in the tube 24, which has a bore of relatively rigid and fixed transverse cross-sectional area perpendicular to the longitudinal axis A1. To eliminate tangles or overlaps of the fibers 22, the technician manually aligns the twelve fibers 22 approximately along the transverse line 26. The axial position of the transverse line 26 relative to the proximal end 28 of the tube 24 is selected to try to avoid any tangles or overlaps from occurring between the transverse line 26, where the fibers are transversely aligned in a single row, and the proximal end 28 of the tube 24.

The manual fiber feeding process depicted in FIG. 2 can be challenging and time consuming. For example, in order to maintain transverse alignment of the fibers at the line 26, the technician must apply some amount of squeezing force to the fibers, which can hamper or prevent the fibers 22 from being advanced in the axial direction into the tube 24. Another problem lies in the difficulty of performing essentially three simultaneous actions (holding the tube, holding the fibers in an aligned manner, and advancing the fibers) with two hands.

The tools and methods of the present disclosure help to alleviate at least some of the problems described above.

Figure 3:
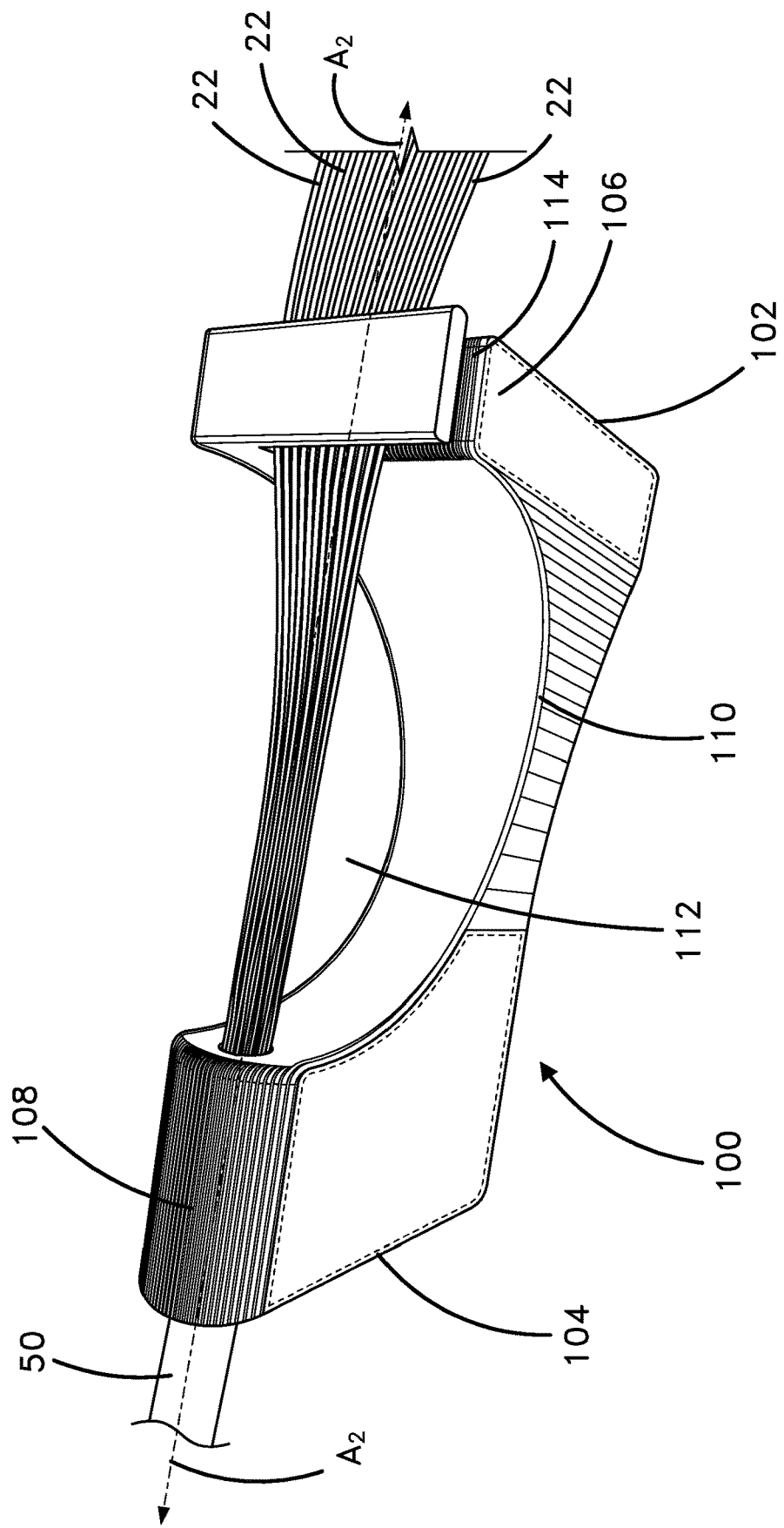
FIG. 3 represents an example method of feeding optical fibers into a fiber routing or protective tube using a tool in accordance with the present disclosure.
Figure 4:
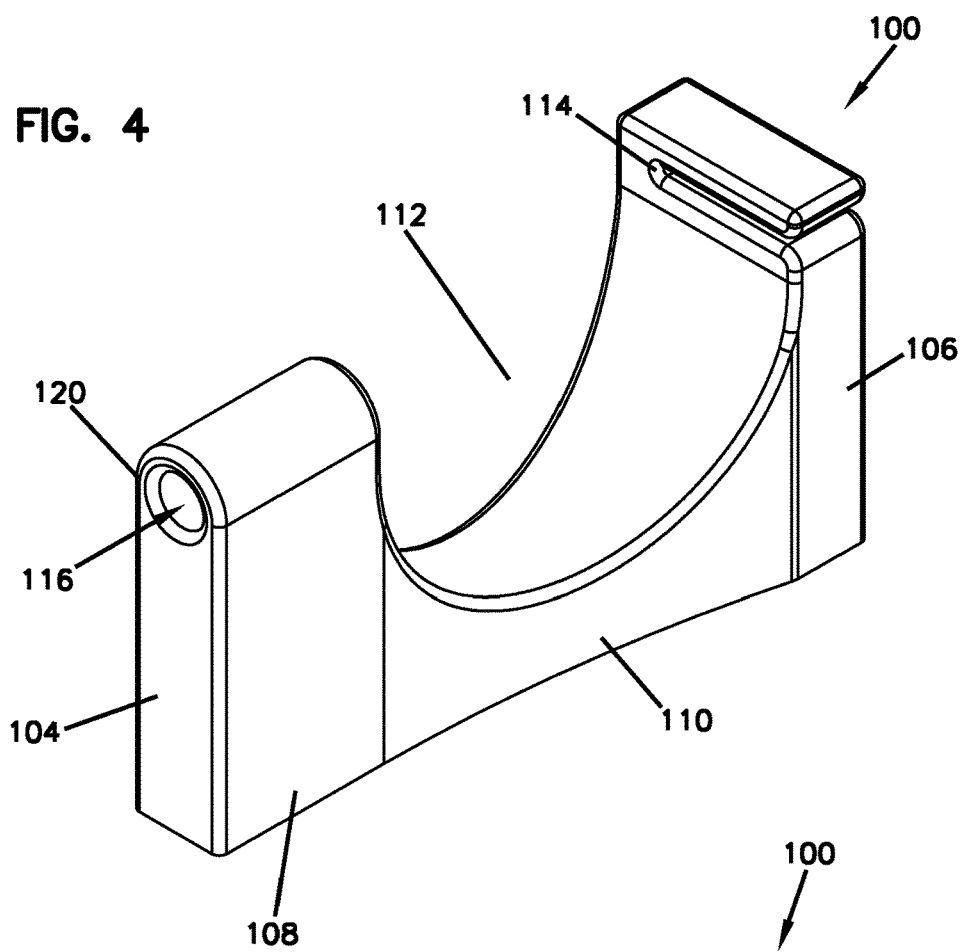
FIG. 4 is a top, distal perspective view of an embodiment of a tool for feeding a plurality of optical fibers into a tube in accordance with the present disclosure.
Figure 5:
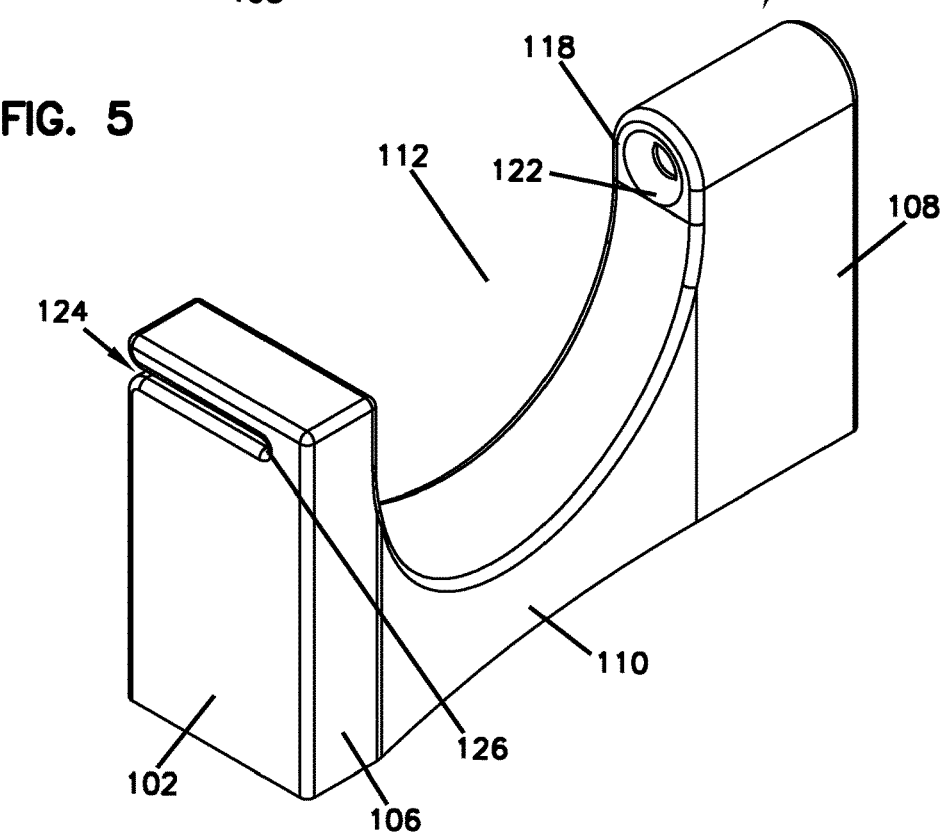
FIG. 5 is a top, proximal perspective view of the embodiment of FIG. 4.

Referring now to FIG. 3, in an improvement over the prior art, an example method of feeding twelve optical fibers 22 into a fiber routing tube 50 using a tool 100 is represented in accordance with the present disclosure. Optionally, the fiber routing tube 50 can correspond to one of the tubes 12 or the tube 24 described above.

Referring still to FIG. 3, the tool 100 extends axially along the longitudinal axis A2 from a proximal end 102 to a distal end 104. The tool 100 includes a base 110. In this example, the base 110 rests on a horizontal surface 60. Extending vertically from the base 110 are a first arm 106 and a second arm 108, the second arm 108 being positioned distally from the first arm 106. The second arm supports a distal end (not shown) of the tube 50. The first arm 106 includes a transversely elongated slot 114 that supports portions of the twelve fibers 22 transversely aligned in a single row. Between the arms 106 and 108 and above the base 110 is a void 112 which functions as a fiber handling region for feeding the fibers 22 into the tube 50. The tool 100 will now be described in greater detail.

Referring to FIGS. 4-8, the tool 100 has a proximal end 102, a distal end 104, a first arm 106, a second arm 108, a base 110, a fiber handling region 112, and a transversely elongated slot 114, as described above.

The second arm 108 includes an axially elongated passage 116 having a proximal end 118 open to the fiber handling region 112 and an open distal end 120.

Optionally, a portion 122 of the passage 116 tapers distally from the proximal end of the passage 116, the tapered portion narrowing towards the axis A2. The tapered portion 122 can assist in guiding fibers (e.g., the fibers 22) distally into the passage 116.

The slot 114 is elongated in a direction perpendicular to the axis A2 and has an open end 124 and an opposing closed end 126. Optical fibers (e.g., the fibers 22) can be transversely/radially loaded into the slot 114 via the open end 124. Optionally one or more chamfers 128 can be disposed at the open end 124 to assist in guiding optical fibers (e.g., the fibers 22), into the slot 114. The slot 114 is also open at its proximal side 134 and at its distal side 132, which is open to the fiber handling region 112.

Alternatively, the fibers can be loaded axially into the slot 114 from the proximal end 102 of the tool 100. Thus, it should be appreciated that the slot 114 need not have an open end 124, and the fibers can be, in some examples, axially fed into the slot 114.

The base 110 has a bottom planar surface 130 adapted to rest on a horizontal surface, e.g., a work surface. For ease of description, the planar surface 130 will be described herein as a horizontal surface and the arms 106 and 108 extend vertically from the base 110, i.e., perpendicular to the horizontal surface 130. The horizontal surface 130, and also the base 110, generally narrow from the proximal end 102 to the distal end 104, corresponding to a first arm 106 that is wider (to accommodate the horizontally elongate slot 114) than the second arm 108.

In some examples, the maximum vertical width w1 of the slot 114 interior to the chamfers 128 is at least as large as a maximum transverse thickness $t_M$ of a fiber (e.g. a fiber 22) to be aligned in the slot 114. In some examples, the maximum vertical width w1 is also smaller than twice $t_M$. Thus, for example, for a tool configured to align 900 μm thick fibers, the vertical width w1 can be, in some examples, greater than or equal to 900 μm and less than 1800 μm. In another example, for a tool configured to align 200 μm thick fibers, the vertical width w1 can be, in some examples, greater than or equal to 200 μm and less than 400 μm. In another example, for a tool configured to align 250 μm thick fibers, the vertical width w1 can be, in some examples, greater than or equal to 250 μm and less than 500 μm. Providing a slot 114 with a width w1 that is less than twice $t_M$ can help prevent tangles or overlaps of fibers in or near the slot 114. In other examples, however, the vertical width w1 can be larger than twice the fiber thickness.

A distance L1 between the distal side 132 of the slot 114 and the proximal end 118 of the passage 116 is selected to provide a handling region 112 of sufficient size, e.g., to comfortably accommodate a technician's hand(s), without being so long that the fibers 22 would tend to tangle or overlap before being fed into the tube. In some examples, e.g., for a tool configured to align and feed 900 µm, 250 µm, or 200 µm thick fibers, the distance L1 is in a range from about 2 cm to about 15 cm. In some examples, the distance L1 is in a range from about 4 cm to about 10 cm. Distances outside of these ranges can also be suitable.

The slot 114 has an axial length L2 defined between its proximal and distal sides 134 and 132, respectively. In some examples, the length L2 and the distance L1 are proportional according to a predefined formula or ratio configured to minimize tangling or overlapping of fibers. For example, a ratio of L2:L1 can be at least 1:2, at least 1:3, at least 1:4, at least 1:5, at least 1:6, at least 1:7, at least 1:8, at least 1:9, at least 1:10, or at least another minimum ratio.

The axial passage 116 has a round transverse cross-section. The smallest size of the transverse cross-section (i.e., interior to the tapered portion 122) can be selected to snugly receive a tube (e.g., the tube 50) of predefined transverse size/outer diameter (e.g., via an interference fit). Alternatively, the transverse cross-section can be larger than the tube such that the tube is received by the passage 116 within a predefined tolerance.

The axial passage 116 has an axial length L3 defined between the passage's proximal and distal ends 118 and 120, respectively. The length L3 can be selected to be long enough to hold the tube (e.g., the tube 50) in place without support from the technician or another tool.

Figure 6:
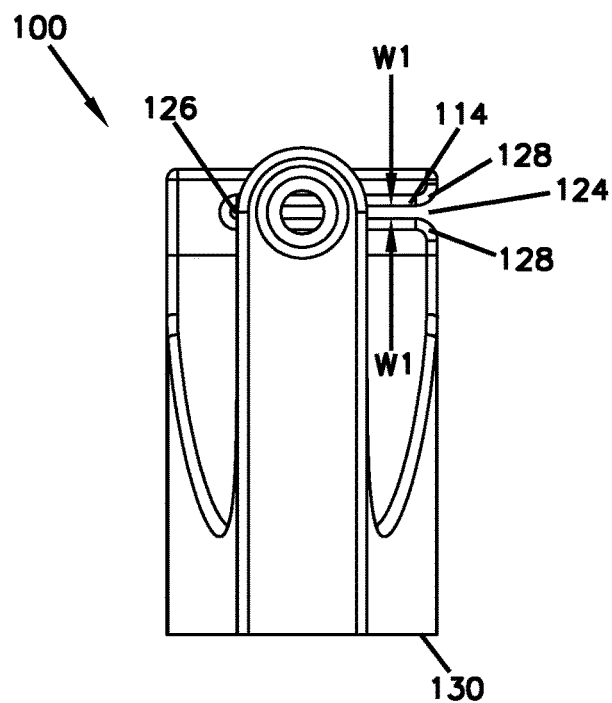
FIG. 6 is a distal end view of the embodiment of FIG. 4.
Figure 7:
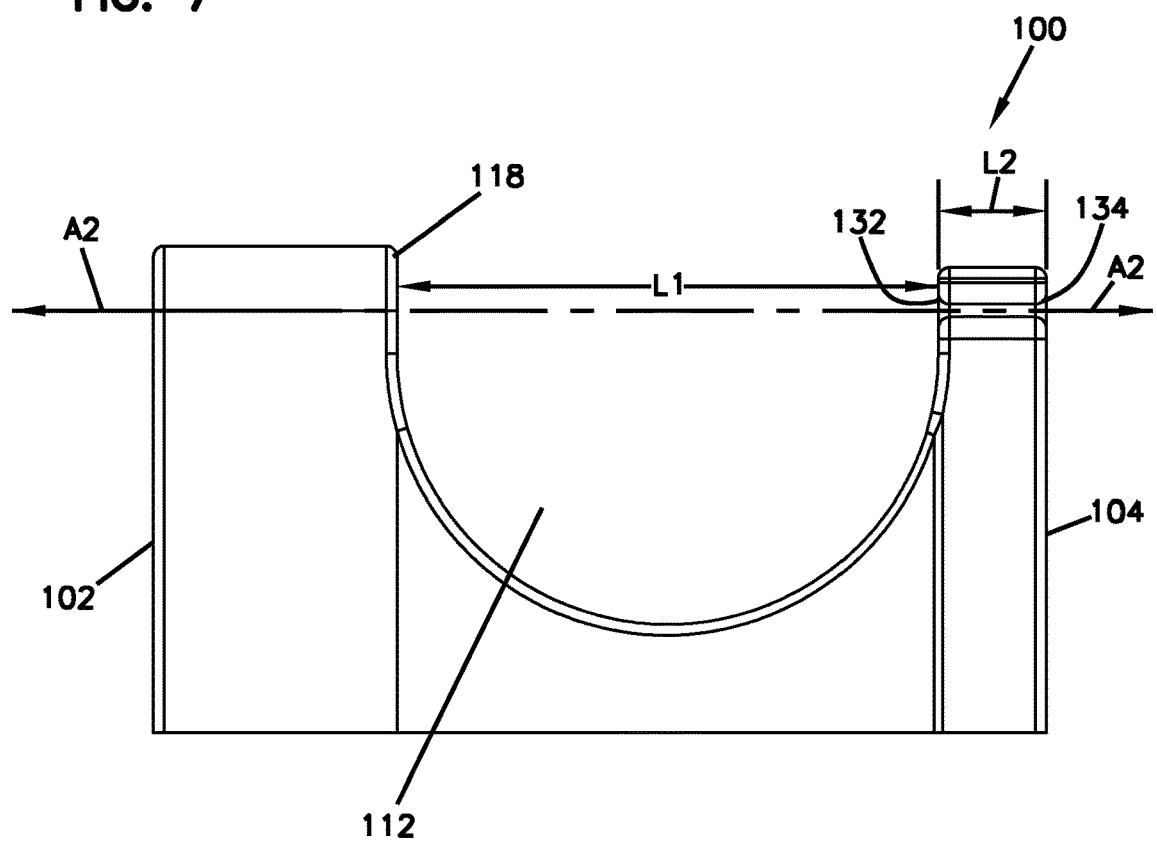
FIG. 7 is a side view of the embodiment of FIG. 4.
Figure 8:
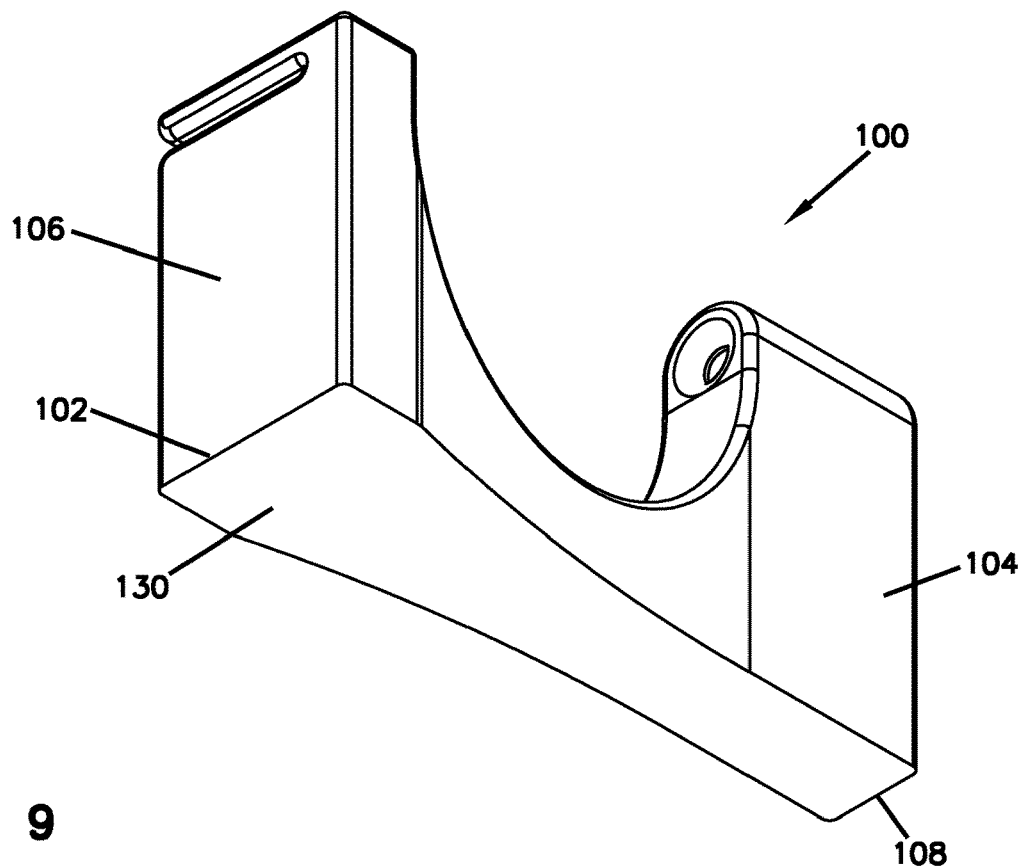
FIG. 8 is a bottom, proximal perspective view of the embodiment of FIG. 4.
Figure 9:
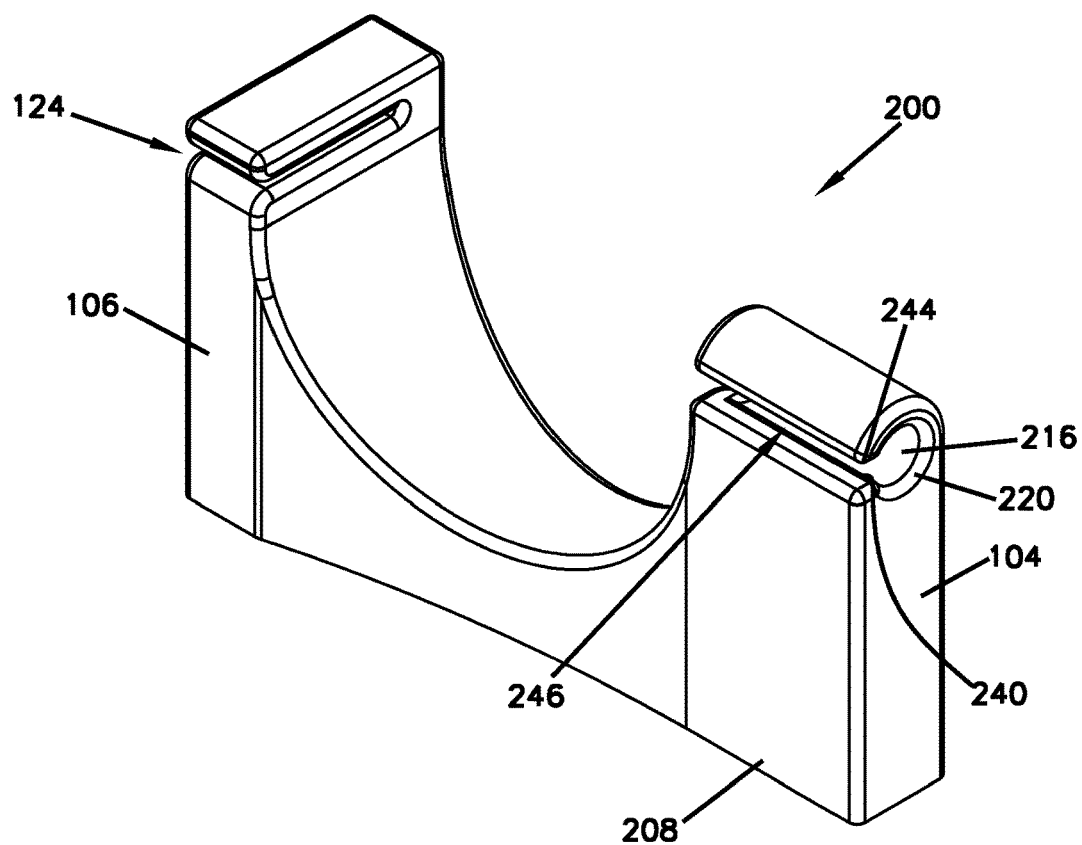
FIG. 9 is a top, distal perspective view of a further embodiment of a tool for feeding a plurality of optical fibers into a tube in accordance with the present disclosure.
Figure 10:
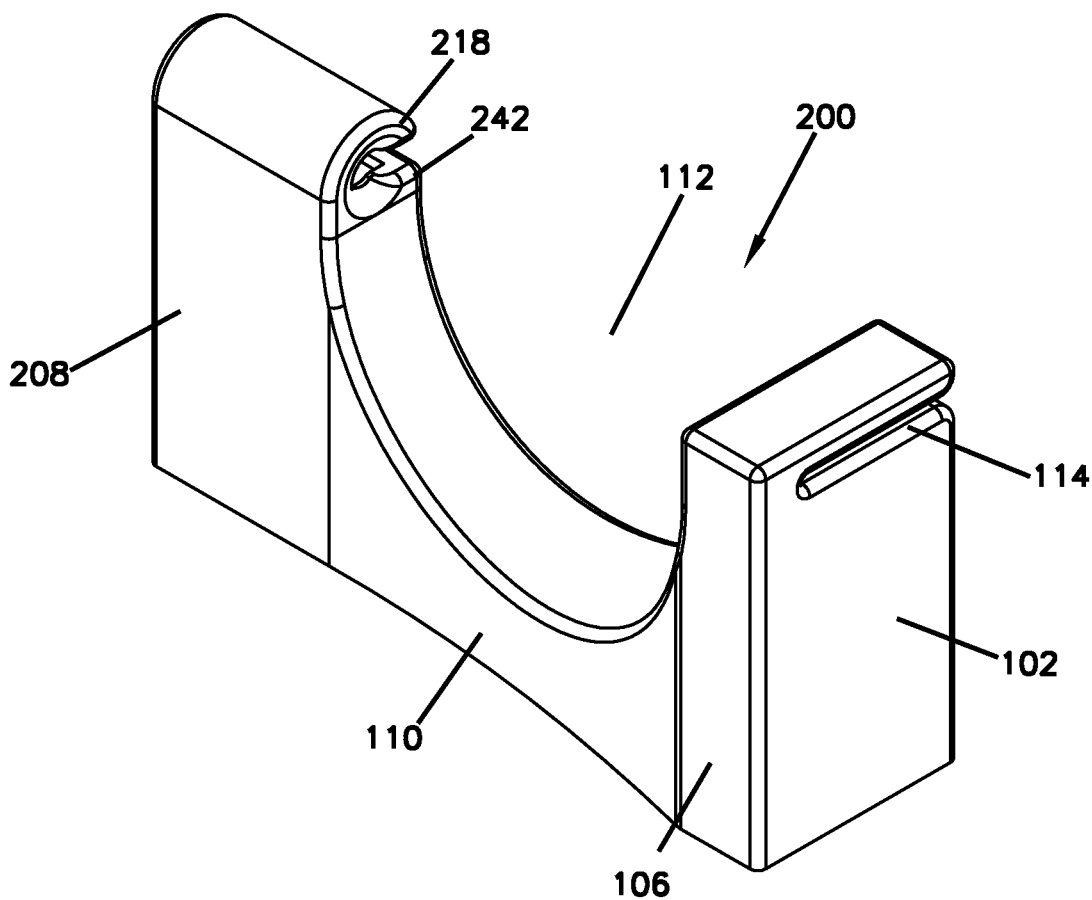
FIG. 10 is a top, proximal perspective view of the embodiment of FIG. 9.

As shown in FIG. 6, a vertical center of the slot 114 is at the same vertical height relative to the bottom horizontal surface 130 as the vertical center of the passage 116. Thus, the passage 116 and the slot 114 are axially aligned in the same horizontal plane. Axially aligning the passage and the slot in this manner can facilitate feeding of the optical fibers from the slot to the passage.

In an example method of using the tool 100, an end of a tube 50 is positioned in the passage 116 from the distal end 104 of the tool 100, the tube extending distally from the tool (the tube can partially or completely fill the passage 116); a plurality of fibers 22 are loaded in a single transverse (in this example, horizontal) row in the slot 114 via the open end 124, with distal ends of the fibers positioned in the handling region 112; the fibers 22 are grasped and distally advanced to the proximal end 118 of the passage 116; the fibers 22 are bundled at or near the proximal end 118 of the passage 116 and distally advanced/fed into the passage 116 and into the tube 50.

Referring now to FIGS. 9-16, a further embodiment of a tool 200 is depicted. The tool 200 is structurally similar to the tool 100 in many ways. In the interest of brevity, the following description will focus largely on the differences between the tool 200 and the tool 100 described above.

The second arm 208 of the tool 200 defines the axial passage 216 extending from an open proximal end 218 to an open distal end 220. The second arm 208 also defines an axially elongated slot 240 that provides transverse/radial access to the passage 216. The slot 240 extends along the entire axial length of the passage 216, having open proximal and distal ends 242 and 244, respectively. The slot 240 is open to the exterior of the tool 200 and to the passage 216.

Figure 11:
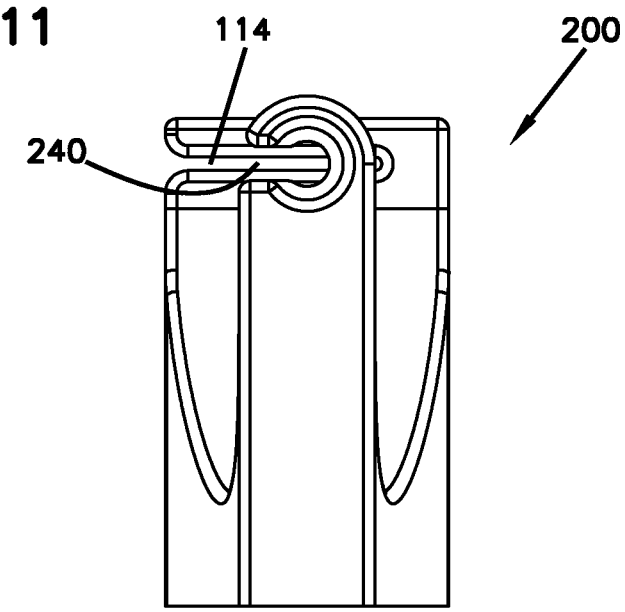
FIG. 11 is a distal end view of the embodiment of FIG. 9.
Figure 12:
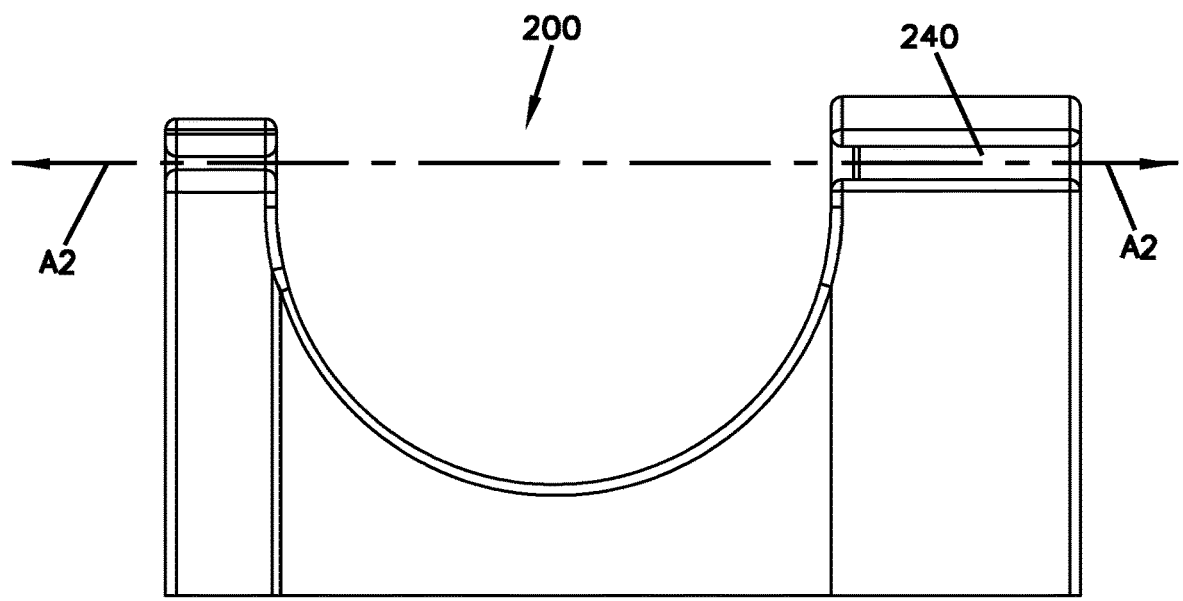
FIG. 12 is a side view of the embodiment of FIG. 9.
Figure 13:
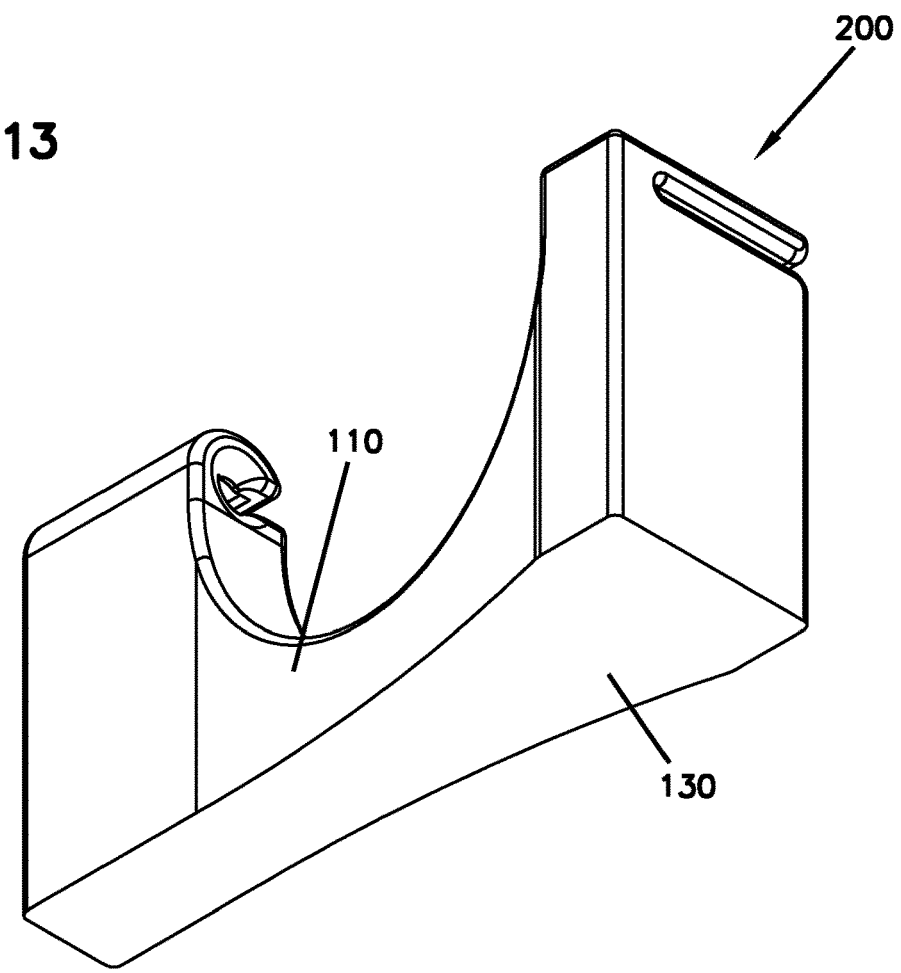
FIG. 13 is a bottom, proximal perspective view of the embodiment of FIG. 9.
Figure 14:
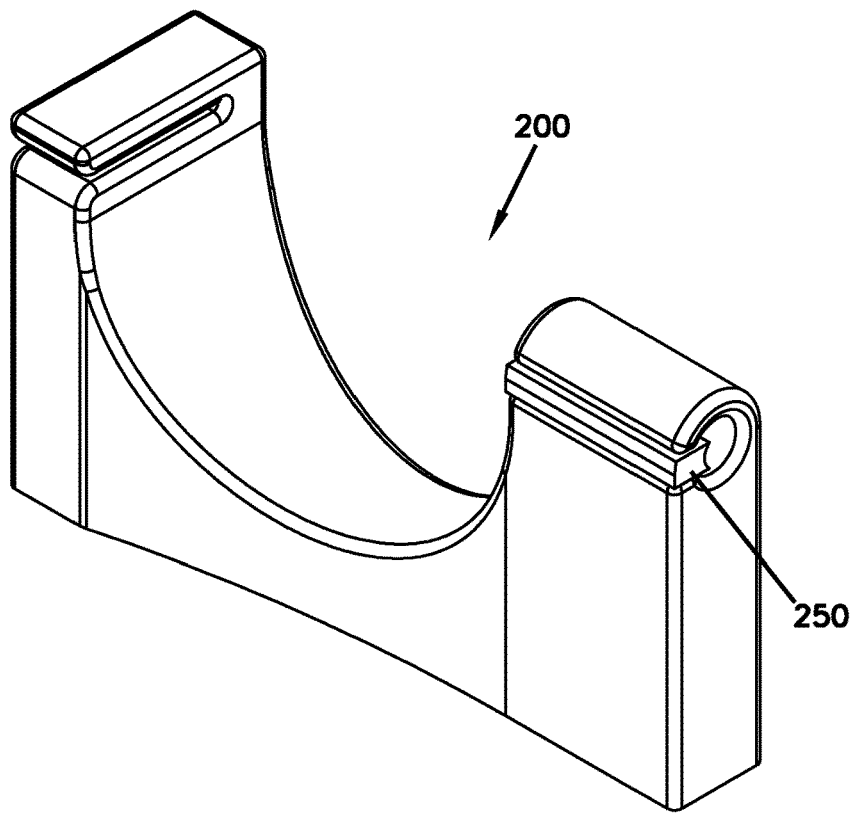
FIG. 14 is a top, distal perspective view of the embodiment of FIG. 9, including an example clamping piece in accordance with the present disclosure.
Figure 15:
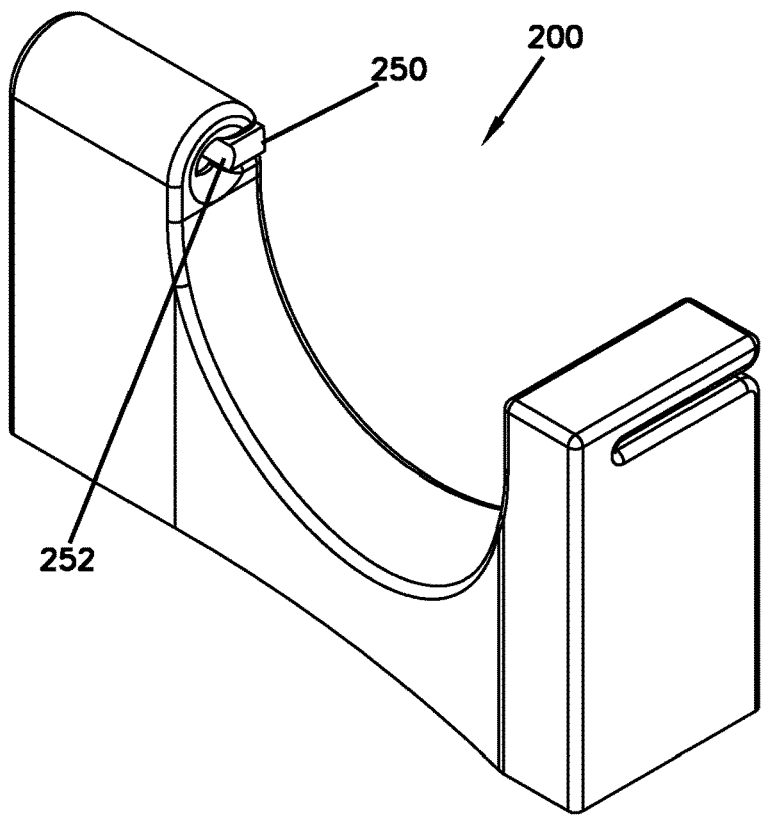
FIG. 15 is a top, proximal perspective view of the tool and clamping piece of FIG. 14.
Figure 16:
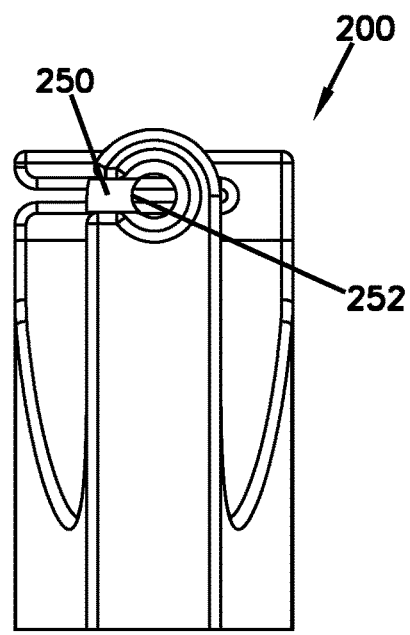
FIG. 16 is a distal end view of the tool and clamping piece of FIG. 14.
Figure 17:
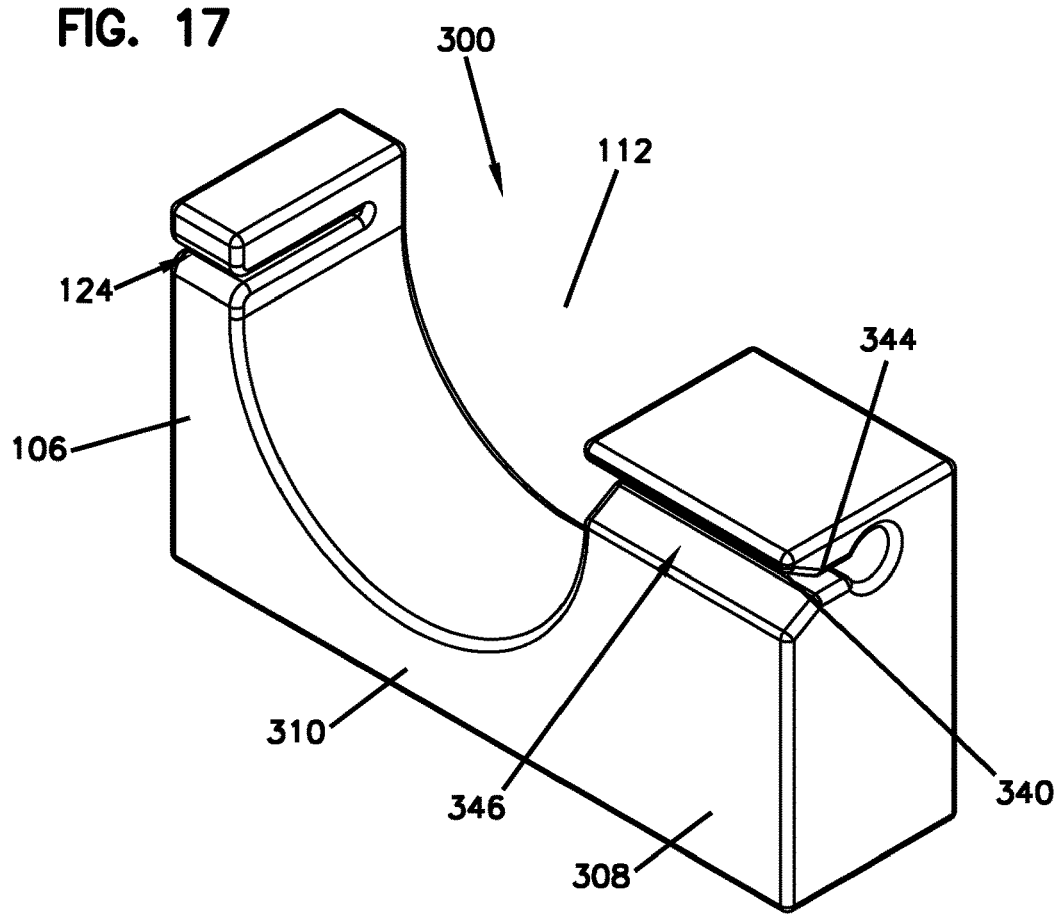
FIG. 17 is a top, distal perspective view of a further embodiment of a tool for feeding a plurality of optical fibers into a tube in accordance with the present disclosure.
Figure 18:
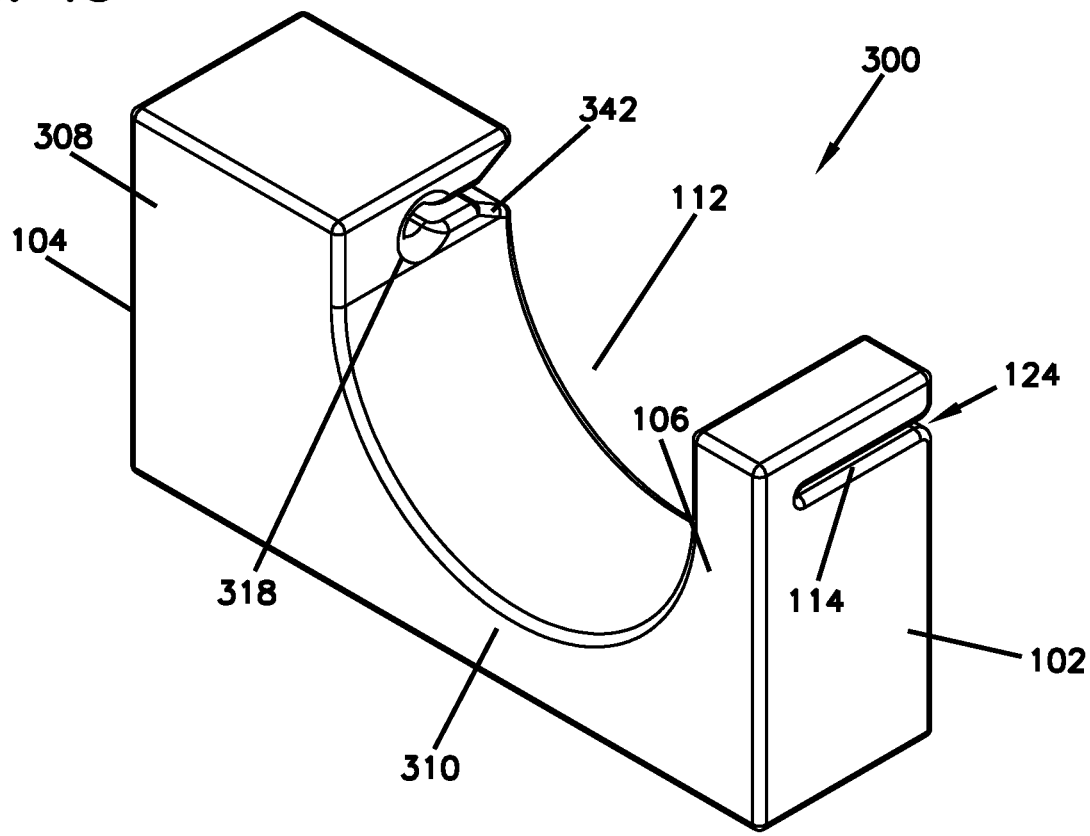
FIG. 18 is a top, proximal perspective view of the embodiment of FIG. 17.

The exteriorly open side or access side 246 of the slot 240 faces the same direction as the open end 124 of the slot 114. In addition, as shown in FIG. 11, vertical centers of the slot 240 and the slot 114 are vertically aligned, i.e., in the same horizontal plane.

The slot 240 allows for radial (instead of or in addition to axial) loading and/or unloading of the optical fibers 22 into/out of the passage 216. For example, because the access side 246 of the slot 240 and the open end 124 of the slot 114 face the same direction, the fibers 22 can be loaded in a single transverse row into the slot 114 while at the same time being transversely loaded into the passage 216; once loaded and bundled into the passage 216, the fibers 22 can be axially advanced into a tube 50 held in the passage 216.

Additionally or alternatively, proximal portions of the fibers 22 can be transversely slid out or unloaded from the passage 216 via the slot 114 and the slot 240 once the distal portions of the fibers have been axially fed into the passage 216 and the tube; this can be particularly useful when proximal ends of the optical fibers are not loose and/or are terminated with connectors, i.e., cannot be axially fed through the passage 216. For example, if the proximal ends of the fibers 22 are connectorized, the connectors would not be able to advance axially through the passage 216. In that situation, the slot 240 allows the fibers 22 to be transversely (rather than axially) removed from the tool 200 once the tube has been loaded. The loaded tube itself can be removed from the passage axially (i.e., via the distal end of the tool) or, in some examples, transversely through the slot 240.

A clamping piece 250 can be provided to plug the axial slot 240 once the fibers have been radially loaded into the passage 216 and/or once the tube has been loaded into the passage. In some examples, the clamping piece 150 is axially as long as the slot 240 that it plugs, and is otherwise dimensioned to slide into the slot 240 in a closely toleranced or interference fit manner.

The clamping piece 250 can serve multiple purposes. For example, the clamping piece 250 can help to prevent optical fibers from coming out of the passage 216 via the slot 240 as they are being axially fed into the tube. In addition, or alternatively, the clamping piece 250 can help to secure the tube (e.g., the tube 50) in the passage 216. Thus, for example, the clamping piece 250 can be pushed into the slot 240 such that it applies a clamping force on the tube to compensate for tolerances between the size of the tube and the size of the passage. To this end, the clamping piece 250 can be provided with a curved concave interior facing surface 252, the surface 252 being adapted to hug the curved convex exterior of a tube, e.g., the tube 50.

In an example method of using the tool 200, a plurality of fibers 22 are loaded in a single transverse (in this example, horizontal) row in the slot 114 via the open end 124 and, optionally, distal portions of the fibers are radially/transversely installed in a proximal section of the passage 216 via the slot 240 and its access side 246; an end of a tube 50 is positioned in at least a distal section of the passage 116 from the distal end 104 of the tool 200, the end of the tube being positioned distally from the distal ends of the fibers, the tube extending distally from the tool 200; the slot 240 is plugged with the clamping piece 250 and such that the surface 252 of the clamping piece 250 abuts and/or applies radial pressure on the tube 50; the fibers 22 are grasped and distally advanced/fed into the tube 50; the clamping piece 250 is removed from the slot 240; the tube 50 loaded with the fibers 22 is disengaged from the tool 200; and, optionally, proximal portions of the optical fibers extending proximally from the end of the tube are slid out of/unloaded from the passage 216 via the slot 240.

Referring now to FIGS. 17-24, a further embodiment of a tool 300 is depicted. The tool 300 is structurally similar to the tool 100 in many ways. In the interest of brevity, the following description will focus largely on the differences between the tool 300 and the tool 100 described above.

In the tool 300, the first arm 106 and the second arm 308 have the same width and so the bottom horizontal surface 330 of the base 310 is rectangular and does not narrow from proximal end 102 to distal end 104 as in the tool 100.

The second arm 308 of the tool 300 defines the axial passage 316 extending from an open proximal end 318 to an open distal end 320. The second arm 308 also defines an axially elongated slot 340 that provides transverse/radial access to the passage 316. The slot 340 extends along the entire axial length of the passage 316, having open proximal and distal ends 342 and 344, respectively. The slot 340 is open to the exterior of the tool 300 and to the passage 316.

Figure 19:
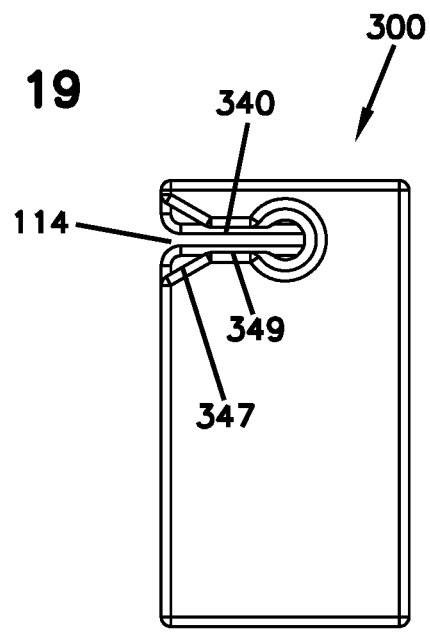
FIG. 19 is a distal end view of the embodiment of FIG. 17.
Figure 20:
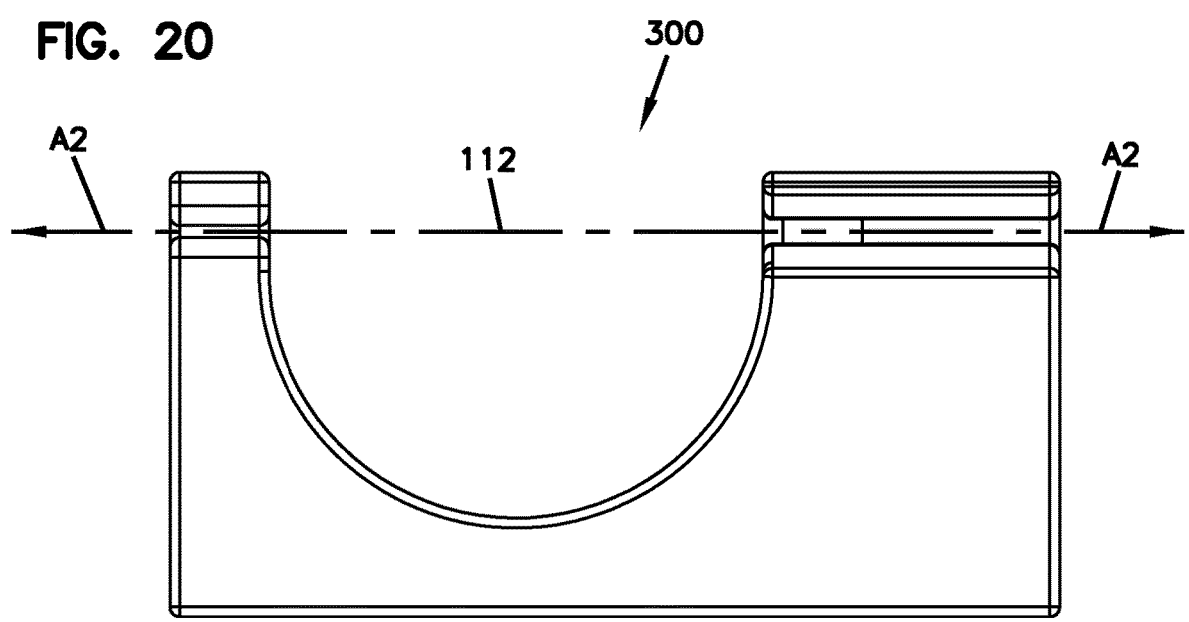
FIG. 20 is a side view of the embodiment of FIG. 17.
Figure 21:
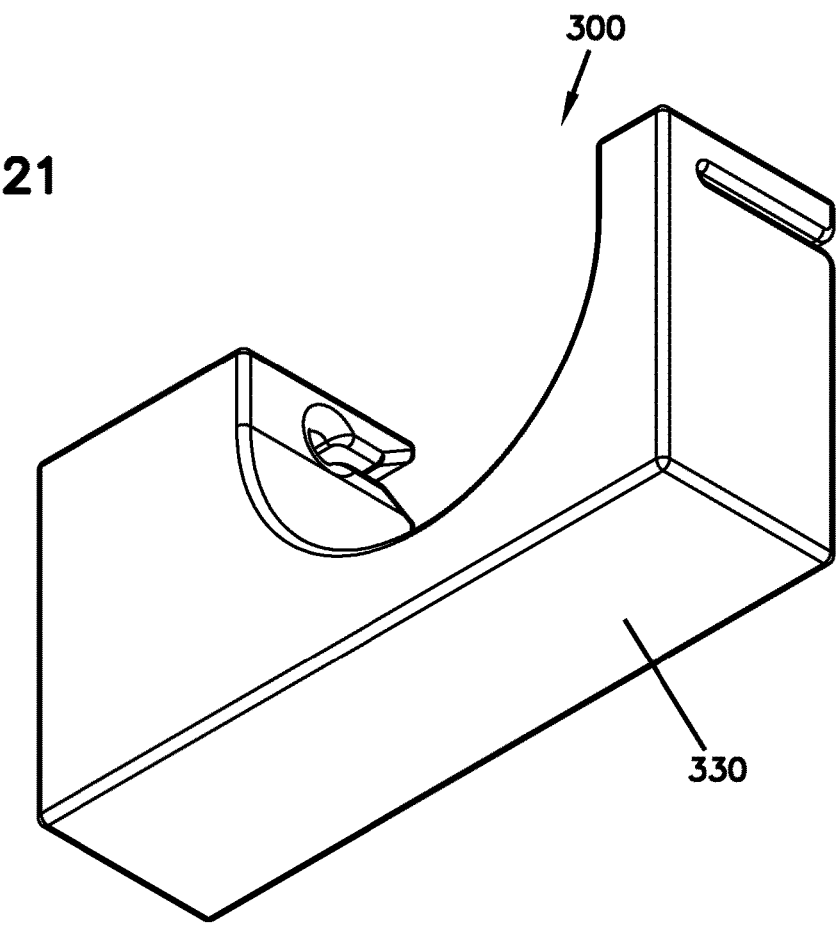
FIG. 21 is a bottom, proximal perspective view of the embodiment of FIG. 17.
Figure 22:
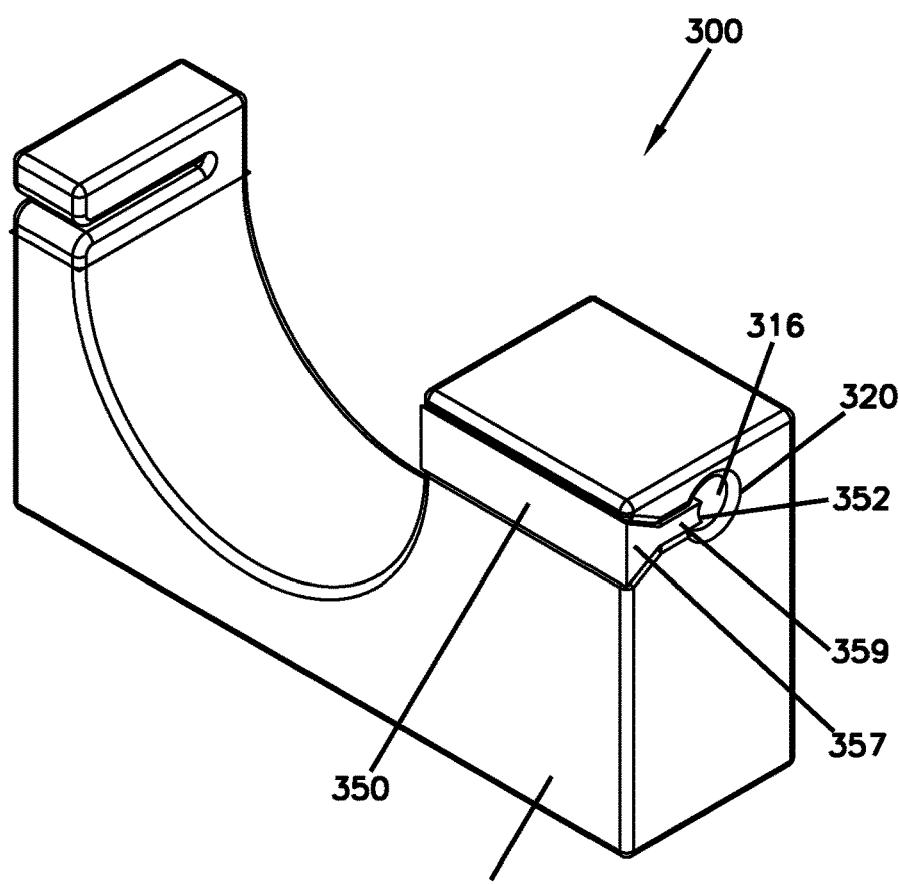
FIG. 22 is a top, distal perspective view of the embodiment of FIG. 17, including a further example clamping piece in accordance with the present disclosure.
Figure 23:
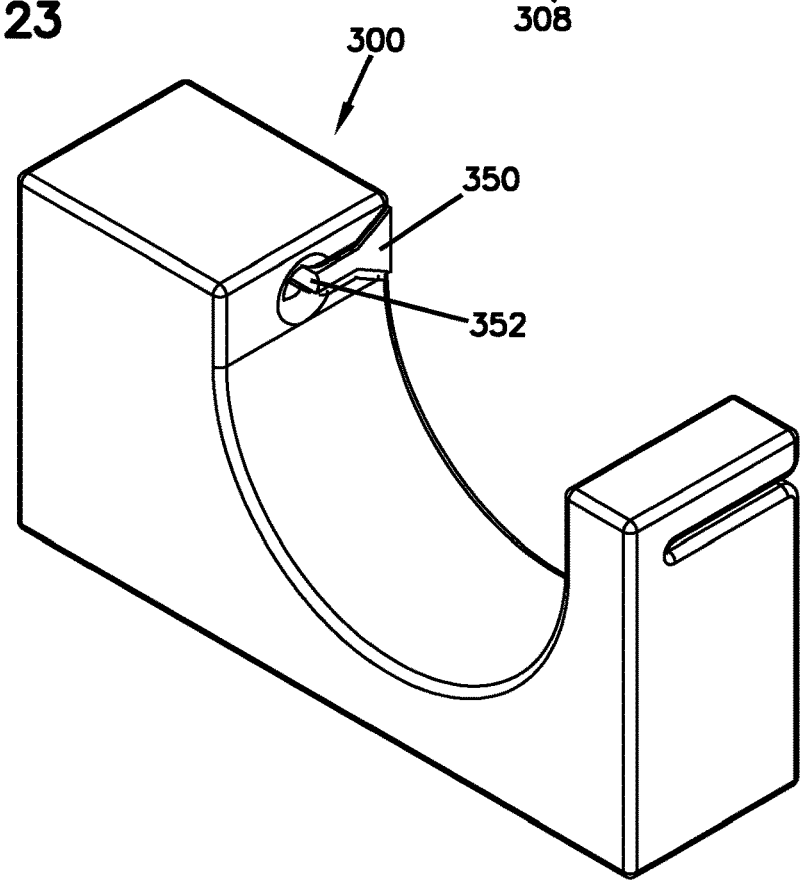
FIG. 23 is a top, proximal perspective view of the tool and clamping piece of FIG. 22.
Figure 24:
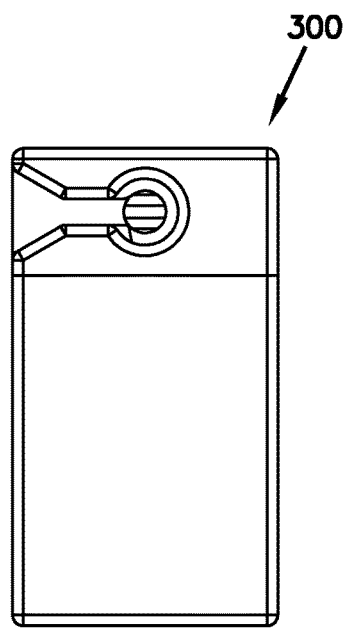
FIG. 24 is a distal end view of the tool and clamping piece of FIG. 22.
Figure 25:
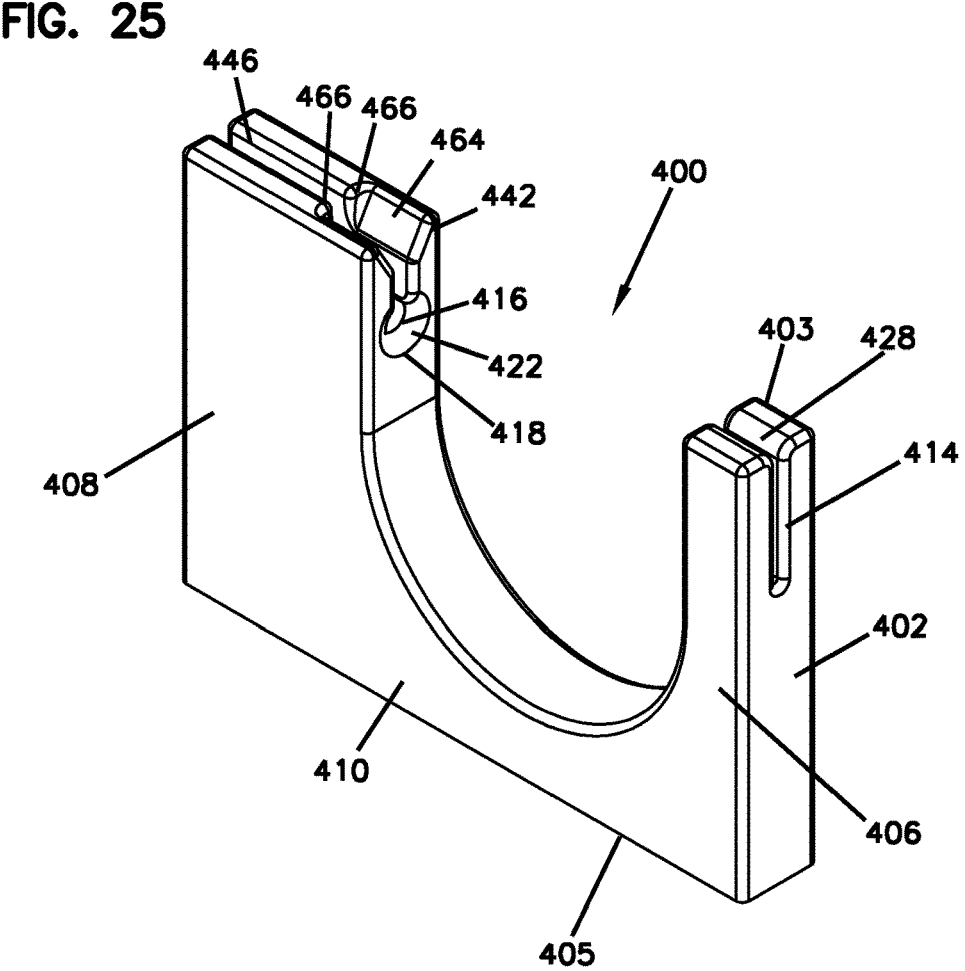
FIG. 25 is a top, proximal perspective view of a further embodiment of a tool for feeding a plurality of optical fibers into a tool in accordance with the present disclosure.
Figure 26:
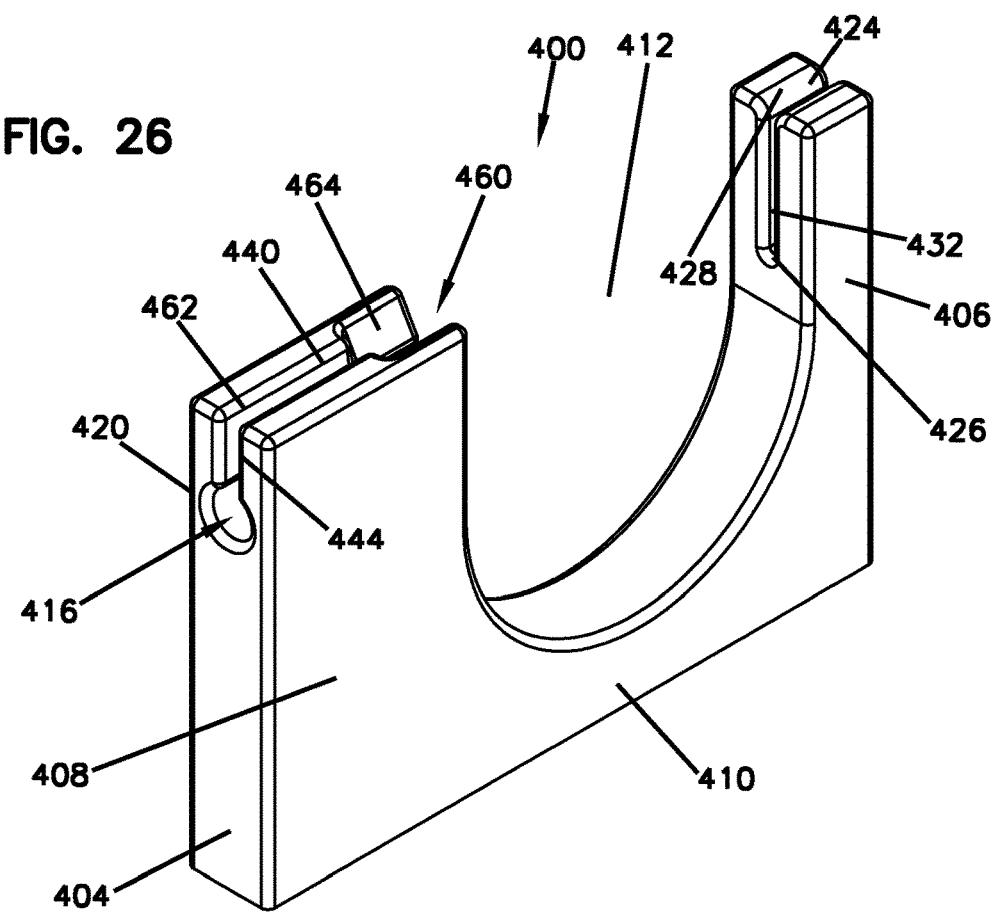
FIG. 26 is a top, distal perspective view of the tool of FIG. 25.

The exteriorly open side or access side 346 of the slot 340 faces the same direction as the open end 124 of the slot 114. In addition, as shown in FIG. 19, vertical centers of the slot 340 and the slot 114 are vertically aligned, i.e., in the same horizontal plane.

The slot 340 allows for radial (in addition to axial) loading of the optical fibers 22 into the passage 316, as well as radial removal or unloading from the passage 316 of proximal portions of fibers that have not been fed into a tube, as well as radial installation and/or removal of the tube itself into/out of the passage. For example, because the access side 346 of the slot 340 and the open end 124 of the slot 114 face the same direction, the fibers 22 can be loaded in a single transverse row into the slot 114 while at the same time being transversely loaded into the passage 316. Once loaded and bundled into the passage 316, the fibers 22 can be axially advanced into a tube 50 held in the passage 316.

Additionally or alternatively, proximal portions of the fibers 22 can be transversely slid out or unloaded from the passage 316 via the slot 114 and the slot 340 once the distal portions of the fibers have been axially fed into the passage 316 and the tube; this can be particularly useful when proximal ends of the optical fibers are not loose and/or are connectorized, i.e., cannot be axially fed through the passage 316. The loaded tube itself can be removed from the passage axially (i.e., via the distal end of the tool 300) or, in some examples, transversely through the slot 340.

A clamping piece 350 can be provided to plug the axial slot 340 once the fibers and/or tube have been loaded into the passage 316. In some examples, the clamping piece 350 is axially as long as the slot 340 that it plugs, and is otherwise dimensioned to slide into the slot 340 in a closely toleranced or interference fit manner.

In this particular example, the slot 340 includes a tapering section 347 and a narrow non-tapering section 349. The tapering section 347 narrows as it extends radially/transversely from the access side 346 to the narrow section 349, and the narrow section 349 extends radially from the tapering section 347 to the passage 316 (when installed in the tool 300), the narrow section 349 being open to the passage 316. When fibers 22 are loaded/unloaded into/out of the passage 316 via the slot 340 they pass through the tapering section 347 and the narrow section 349. The tapering section 347 can assist in the loading procedure, e.g., can assist in bundling the optical fibers in the configuration they will be in when housed in the tube. The tapering section can similarly assist in installing the tube in the passage 316 and/or removing the loaded tube from the passage 316.

The clamping piece 350 is geometrically complementary to the slot 340. Thus, the clamping pieces 350 includes a tapered or wedged portion 357 and a narrow or non-tapered portion 359. The tapered portion 357 is configured to be received in the tapering section 347 and the narrow portion 359 is adapted to be received in the narrow section 349.

The clamping piece 350 can serve multiple purposes. For example, the clamping piece 350 can help to prevent optical fibers from coming out of the passage 316 via the slot 340. In addition, or alternatively, the clamping piece 350 can help to secure the tube (e.g., the tube 50) in the passage 316. Thus, for example, the clamping piece 350 can be pushed into the slot 340 such that it applies a clamping force on the tube to compensate for tolerances between the size of the tube and the size of the passage. To this end, the clamping piece 350 can be provided with a curved concave interior facing surface 352, the surface 352 being adapted to hug the curved convex exterior of a tube, e.g., the tube 50.

In an example method of using the tool 300, a plurality of fibers 22 are loaded in a single transverse (in this example, horizontal) row in the slot 114 via the open end 124; optionally, distal portions of the fibers are radially installed in a proximal section of the passage 316 via the slot 340 and its access side 346; an end of a tube 50 is positioned in at least a distal section of the passage 316 from the distal end 104 of the tool 300 or transversely via the slot 340, the end of the tube being positioned distally from the distal ends of the fibers, the tube extending distally from the tool 300; the slot 340 is plugged with the clamping piece 350 and such that the surface 352 of the clamping piece 350 abuts and/or applies radial/transverse pressure on the tube 50; the fibers 22 are grasped and distally advanced/fed into the tube 50; the clamping piece 350 is removed from the slot 340; the tube 50 loaded with the fibers is disengaged from the tool 300 either by sliding the tube axially or transversely through the slot 340; and, optionally, proximal portions of the optical fibers extending proximally from the end of the tube are slid out of/unloaded from the passage 316 via the slot 340.

Referring now to FIGS. 25-30, a further embodiment of a tool 400 in accordance will be described.

The tool 400 has a proximal end 402, a distal end 404, a first arm 406, a second arm 408, a base 410, and a fiber handling region 412, the first and second arms 406 and 408 extending vertically from the base 410. The first arm 406 includes a transversely elongated slot 414, the slot 414 extending vertically from a top 403 of the tool 400 towards the bottom 405 of the tool 400.

The second arm 408 includes an axially elongated passage 416 having a proximal end 418 open to the fiber handling region 412 and an open distal end 420.

Optionally, a portion 422 of the passage 416 tapers distally from the proximal end of the passage 416, the tapered portion 422 narrowing towards the axis A3 passing axially though the center of the passage 416. The tapered portion 422 can assist in guiding fibers (e.g., the fibers 22) distally into the passage 416.

The slot 414 is elongated in a direction perpendicular to the axis A3 (in this case vertically) and has an open end 424 at the top 403 of the tool 400 and an opposing closed end 426. Optical fibers (e.g., the fibers 22) can be transversely/radially/vertically loaded into the slot 414 via the open end 424. Optionally one or more chamfers 428 can be disposed at the open end 424 to assist in guiding optical fibers (e.g., the fibers 22), in the slot 414. The slot 414 is also open at its proximal side 434 and at its distal side 432, which is open to the fiber handling region 412.

Alternatively, the fibers can be loaded axially into the slot 414 from the proximal end 402 of the tool 400. Thus, it should be appreciated that the slot 414 need not have an open end 424, and the fibers can be, in some examples, axially fed into the slot 414.

The base 410 has a bottom planar surface 430 adapted to rest on a horizontal surface, e.g., a work surface. For ease of description, the planar surface 430 will be described herein as a horizontal surface and the arms 406 and 408 extend vertically from the base 410, i.e., perpendicular to the horizontal surface 430.

In some examples, the maximum horizontal width w2 of the slot 414 interior to the chamfers 428 is at least as large as a maximum transverse thickness $t_M$ of a fiber (e.g. a fiber 22) to be aligned in the slot 414. In some examples, the maximum vertical width w2 is also smaller than twice $t_M$. Thus, for example, for a tool 400 configured to align 900 μm thick fibers, the horizontal width w2 can be, in some examples, greater than or equal to 900 μm and less than 1800 μm. In another example, for a tool configured to align 200 μm thick fibers, the horizontal width w2 can be, in some examples, greater than or equal to 200 μm and less than 400 μm. In another example, for a tool configured to align 250 μm thick fibers, the horizontal width w2 can be, in some examples, greater than or equal to 250 μm and less than 500 μm. Providing a slot 414 with a width w2 that is less than twice $t_M$ can help prevent tangles or overlaps of fibers in or near the slot 414. In other examples, the horizontal width w2 can be larger than twice the fiber thickness.

A distance L4 between the distal side 432 of the slot 414 and the proximal end 418 of the passage 416 is selected to provide a handling region 412 of sufficient size, e.g., to comfortably accommodate a technician's hand(s) without being so long that the fibers 22 would tend to tangle or overlap before being fed into the tube. In some examples, e.g., for a tool configured to align and feed 900 μm, 250 μm, or 200 μm thick fibers, the distance L4 is in a range from about 2 cm to about 15 cm. In some examples, the distance L4 is in a range from about 4 cm to about 10 cm. Distances outside of these ranges can also be suitable.

The slot 414 has an axial length L5 defined between its proximal and distal sides 434 and 432 respectively. In some examples, the length L5 and the distance L4 are proportional according to a predefined formula or ratio configured to minimize tangling or overlapping of fibers. For example, a ratio of L5:L4 can be at least 1:2, at least 1:3, at least 1:4, at least 1:5, at least 1:6, at least 1:7, at least 1:8, at least 1:9, at least 1:10, or at least another minimum ratio.

The axial passage 416 has a transverse cross-section adapted to receive a tube. The smallest size of the transverse cross-section (i.e., interior to the tapered portion 422) can be selected to snugly receive a tube (e.g., the tube 50) of predefined transverse size/outer diameter (e.g., via an interference fit). Alternatively, the transverse cross-section can be larger than the tube such that the tube is received by the passage 416 within a predefined tolerance.

The axial passage 416 has an axial length L6 defined between the passage's proximal and distal ends 418 and 420. The length L6 can be selected to be long enough to hold the tube (e.g., the tube 50) in place within the passage 416 without support from the technician or another tool.

Figure 27:
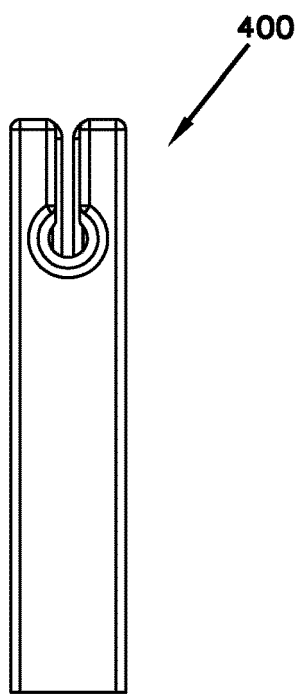
FIG. 27 is a distal end view of the tool of FIG. 25.
Figure 28:
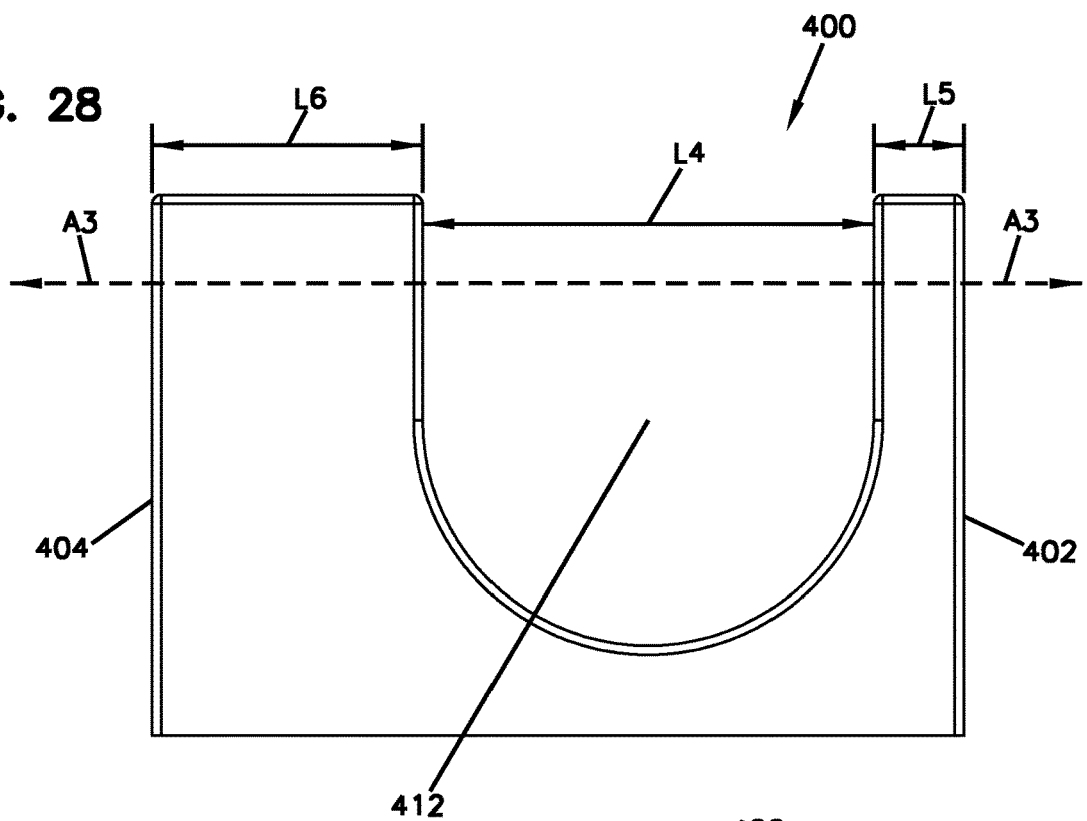
FIG. 28 is a side view of the tool of FIG. 25.
Figure 29:
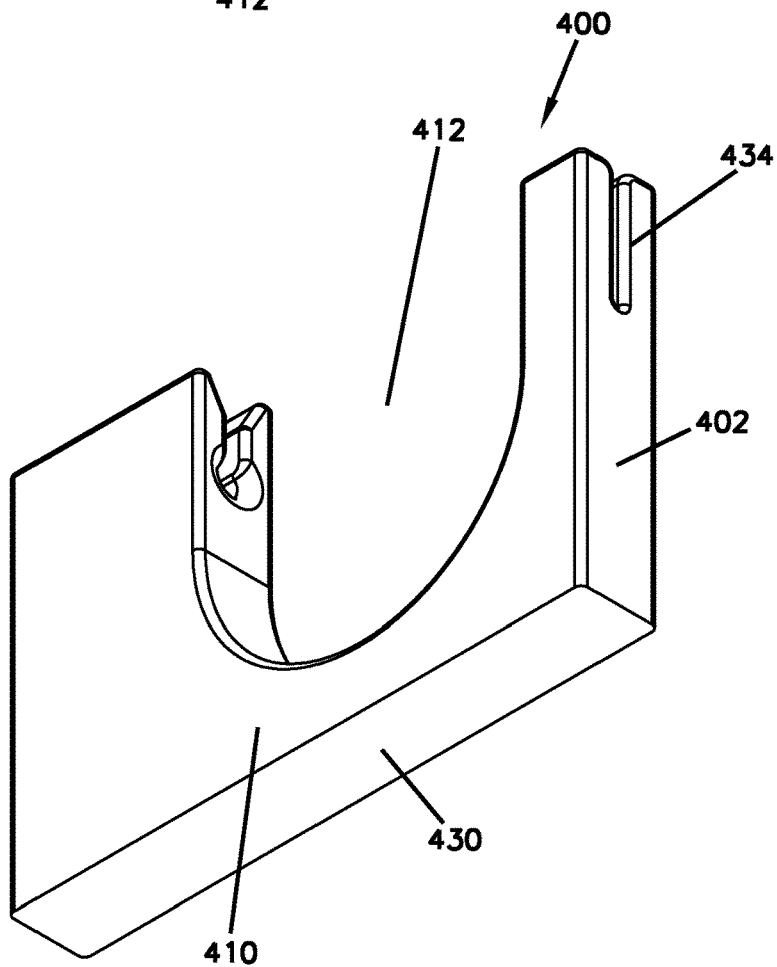
FIG. 29 is a bottom, proximal end view of the tool of FIG. 25.
Figure 30:
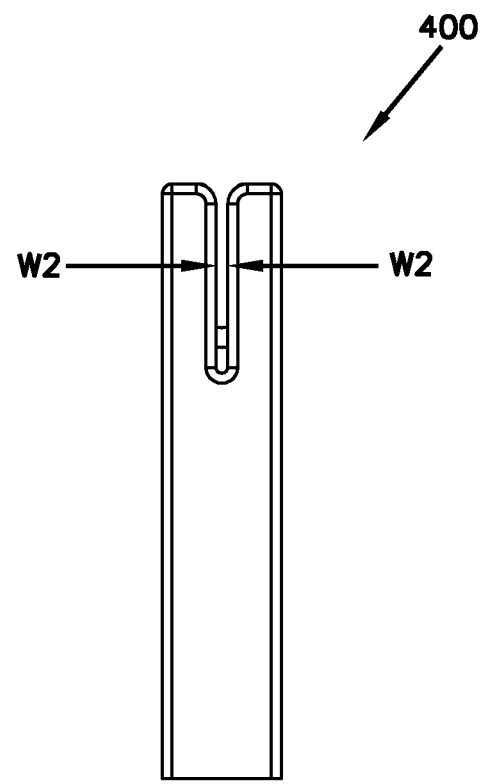
FIG. 30 is a proximal end view of the tool of FIG. 25.

As shown in FIG. 27, a horizontal center of the slot 414 is at the same vertical height relative to the bottom horizontal surface 430 as the vertical center of the passage 416. Thus, the passage 416 and the slot 414 are axially aligned. Axially aligning the passage and the slot in this manner can facilitate feeding of the optical fibers from the slot to the passage.

The second arm 408 also defines an axially elongated slot 440 that provides transverse/radial/vertical access to the passage 416. The slot 440 extends along the entire axial length of the passage 416, having open proximal and distal ends 442 and 444, respectively. The slot 440 is open to the exterior of the tool 400 and to the passage 416.

The slot 440 includes a proximal section 460 that opens to the handling region 412, and a distal section 462 that opens at the distal end 404 of the tool 400. The proximal and distal sections are also open to each other. The proximal section 460 has a vertically tapering region defined by walls 464. The distal section 462 does not taper in the same manner, such that shoulders 466 are formed where the proximal section 460 and the distal section 462 meet.

The exteriorly open side or access side 446 of the slot 440 faces the same direction as the open end 424 of the slot 414. In addition, as shown in FIG. 27, horizontal centers of the slot 440 and the slot 414 are horizontally aligned, i.e., in the same vertical plane.

The slot 440 allows for radial (instead of or in addition to axial) loading or unloading of the optical fibers 22 into or out of the passage 416. For example, because the access side 446 of the slot 440 and the open end 424 of the slot 414 face the same direction, the fibers 22 can be loaded in a single transverse row into the slot 414 while at the same time being transversely loaded into the passage 416. Once loaded and bundled into the passage 416, the fibers 22 can be axially advanced into a tube 50 held in the passage 416.

Additionally or alternatively, proximal portions of the fibers 22 can be transversely slid out or unloaded from the passage 416 via the slot 414 and the slot 440 once the distal portions of the fibers have been axially fed into the passage 416 and the tube; this can be particularly useful when proximal ends of the optical fibers are not loose or are connectorized, i.e., cannot be axially fed through the passage 416. The loaded tube itself can be removed from the passage axially (i.e., via the distal end of the tool) or, in some examples, transversely through the slot 440.

A clamping piece, such as the clamping piece 350 or a modified version thereof (not shown) can be provided to plug the axial slot 440 once the fibers have been radially loaded into the passage 416 or a portion of the axial slot 440 and/or once the tube has been loaded into the passage 416. Such a clamping piece or multiple clamping pieces can be dimensioned to slide into and nest in the slot 440 or portion of the slot 440 in a closely tolerance or interference manner. Such a clamping piece (pieces) can serve purposes as described above with respect to the clamping pieces 250 and 350.

In a first example method of using the tool 400, a plurality of fibers 22 are loaded in a single transverse (in this example, vertical) row in the slot 414 via the open end 424; optionally, distal portions of the fibers are radially installed in the proximal section 460 of the passage 416 via the slot 440 and its access side 446; an end of a tube 50 is positioned in the distal section 462 of the passage 416 from the distal end 404 of the tool 400 or via the slot 440, the end of the tube being positioned distally from the distal ends of the fibers, the tube extending distally from the tool 400; optionally, the slot 440, or a portion thereof (e.g., the proximal section 460) is plugged with a clamping piece and such that a surface of the clamping piece abuts and/or applies radial pressure on the tube 50; the fibers 22 are grasped and distally advanced/fed into the tube 50; the clamping piece, if used, is removed from the slot 440; the tube 50 loaded with the fibers 22 is disengaged from the tool 400 axially, or transversely through the slot 440; and, optionally, proximal portions of the optical fibers extending proximally from the end of the tube are slid out of/unloaded from the passage 416 via the slot 440.

In a second example method of using the tool 400, an end of a tube 50 is positioned in the passage 416 from the distal end 404 of the tool 400, the tube extending distally from the tool; a plurality of fibers 22 are loaded in a single transverse (in this example, vertical) row in the slot 414 via the open end 424, with distal ends of the fibers positioned in the handling region 412; the fibers 22 are grasped and distally advanced to the proximal end 418 of the passage 416; the fibers 22 are bundled at or near the proximal end 418 of the passage 416 and distally advanced/fed into the passage 416 and into the tube 50; and the tube and fibers are removed from the tool.

Terms such as "top," "bottom," "horizontal," "vertical," "proximal," "distal" and related and similar terms used throughout this disclosure are used for ease of illustration in relating components/areas of the tools of the present disclosure to one another and do not limit how the tools may be used in practice.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A tool for feeding optical fibers into a tube, each of the optical fibers defining a fiber axis having a maximum thickness perpendicular to the fiber axis, the tool comprising:
    a base extending along an axial dimension from a proximal end to a distal end;
    a first arm extending from the base and defining a slot adapted to receive a plurality of the optical fibers in a single row that extends along a transverse dimension perpendicular to the axial dimension, the slot having a maximum width perpendicular to the axial dimension and the transverse dimension, the width being less than twice the maximum thickness; and
    a second arm extending from the base distally of the first arm, the second arm defining a passage having open proximal and distal ends, the passage being adapted to be in axial communication with the tube.

2. The tool of claim 1, wherein the base has a horizontal bottom surface, and wherein the slot is elongated horizontally.

3. The tool of claim 1, wherein the slot has an open end at a side of the tool and an opposing closed end.

4. The tool of claim 1, wherein the base has a horizontal bottom surface, and wherein the slot is elongated vertically.

5. The tool of claim 4, wherein the slot has an open end at a top of the tool and an opposing closed end, the closed end being closer to the bottom surface than the open end.

6. The tool of claim 1, wherein the tool defines a fiber handling region between the first and second arms, the fiber handling region being adapted to facilitate grasping the plurality of optical fibers between the slot and the passage.

7. The tool of claim 1, wherein the slot has an open proximal side and an open distal side.

8. The tool of claim 1, wherein the second arm is adapted to releasably clamp the tube in the passage.

9. The tool of claim 1, wherein the slot is a first slot, and wherein the second arm includes a second slot open to the passage and having an open side through which the optical fibers can be transversely loaded into the passage.

10. The tool of claim 9, wherein the second slot has open proximal and distal ends.

11. The tool of claim 9 wherein the open side of the second slot and an open end of the first slot face the same direction.

12. The tool of claim 9, further comprising a clamping piece insertable in the second slot and adapted to clamp the tube to the second arm while feeding the plurality of optical fibers into the tube.

13. The tool of claim 12, wherein the clamping piece comprises a wedged portion that is geometrically complementary to a tapering section of the second slot.

14. The tool of claim 12, wherein the clamping piece includes a curved concave surface adapted to abut the tube and apply a clamping force to the tube.

15. The tool of claim 1, wherein a vertical center of the slot or the first slot and a vertical center of the passage are in the same horizontal plane.

16. The tool of claim 1, wherein the passage is adapted to hold a portion of the tube.

17. The tool of claim 1, wherein the slot is adapted to receive at least twelve of the optical fibers in the single row.

18. A method of feeding a plurality of optical fibers into a tube, comprising:
    providing a tool, the tool comprising a base extending along an axial direction from a proximal end to a distal end; a first arm extending from the base and defining a slot; and a second arm extending from the base distally of the first arm, the second arm defining a passage having open proximal and distal ends;
    axially aligning the tube with the passage and/or inserting a portion of the tube into the axially elongated passage;
    loading portions of the plurality of fibers into the slot such that the plurality of optical fibers form a single transverse row of fibers within the slot;
    pulling the plurality of optical fibers distally through the slot; and
    feeding the plurality of optical fibers into the tube via the open proximal end of the passage.

19. The method of claim 18, wherein each of the plurality of optical fibers has a transverse diameter, and wherein a total number of the plurality of optical fibers is a maximum number of optical fibers having the transverse diameter that can be axially fed into the tube.

20. The method of claim 18, further comprising clamping the tube in the passage with a clamping piece.

21. The method of claim 18, wherein the slot is a first slot, and wherein the method further comprises, prior to the feeding, transversely inserting the plurality of fibers into the passage via a second slot in the second arm.

22. The method of claim 18, wherein the slot is a first slot, and wherein the method further comprises, subsequent to the feeding, transversely sliding proximal portions of the plurality of fibers out of the tool via a second slot in the second arm.

23. The method of claim 22, further comprising, prior to the transversely sliding, distally sliding and removing the tube from the passage.

24. A method of feeding a plurality of optical fibers into a tube, comprising:
    providing a tool, the tool comprising a base extending along an axial direction from a proximal end to a distal end; a first arm extending from the base and defining a first slot; and a second arm extending from the base distally of the first arm, the second arm defining a passage having open proximal and distal ends, and having a second slot that is open to the passage;

loading first portions of the plurality of optical fibers in a single transverse row in the slot via an open end in the slot;

loading second distal portions of the plurality of optical fibers in a proximal section of the passage via the second slot;

positioning an end of the tube in a distal section of the passage, the end of the tube being positioned distally from the distal ends of the fibers;

optionally, plugging the second slot with a clamping piece such that a surface of the clamping piece abuts the tube;

grasping the plurality of optical fibers;

distally advancing the plurality optical fibers into the tube;

optionally, removing the clamping piece from the second slot; and disengaging the tube loaded with the plurality of optical fibers from the tool.

\* \* \* \* \*